United States Patent
Tanaka et al.

(10) Patent No.: US 10,235,307 B2
(45) Date of Patent: Mar. 19, 2019

(54) OPTICAL TRANSCEIVER AND METHOD OF DOWNLOADING DATA

(71) Applicant: SUMITOMO ELECTRIC INDUSTRIES, LTD., Osaka-shi, Osaka (JP)

(72) Inventors: Hiromi Tanaka, Yokohama (JP); Ryutaro Futami, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/672,757

(22) Filed: Aug. 9, 2017

(65) Prior Publication Data
US 2018/0048391 A1 Feb. 15, 2018

(30) Foreign Application Priority Data

Aug. 12, 2016 (JP) .................. 2016-158593

(51) Int. Cl.
| | | |
|---|---|---|
| *G06F 1/26* | (2006.01) | |
| *G06F 13/10* | (2006.01) | |
| *G06F 13/12* | (2006.01) | |
| *G06F 13/42* | (2006.01) | |

(Continued)

(52) U.S. Cl.
CPC .............. *G06F 13/12* (2013.01); *G06F 1/266* (2013.01); *G06F 13/10* (2013.01); *G06F 13/4234* (2013.01); *H04B 10/40* (2013.01); *G06F 13/385* (2013.01)

(58) Field of Classification Search
CPC ... G06F 1/24; G06F 1/30; G06F 1/305; G06F 2003/0697; G06F 9/06; G06F 9/22; G06F 9/24; G06F 9/44; G06F 9/4401; G06F 9/445; G06F 13/10; G06F 13/12; G06F 13/38; G06F 13/385; G06F 13/387; G06F 13/40; G06F 13/4004; G06F 13/4027;

(Continued)

(56) References Cited

U.S. PATENT DOCUMENTS

| | | | | |
|---|---|---|---|---|
| 9,379,816 B2 * | 6/2016 | Yang | ...................... | H04B 10/40 |
| 9,495,178 B2 * | 11/2016 | Futami | ..................... | G06F 9/445 |
| 9,735,874 B2 * | 8/2017 | Robitaille | .............. | H04B 10/40 |

(Continued)

FOREIGN PATENT DOCUMENTS

| | | |
|---|---|---|
| JP | 2006-101435 A | 4/2006 |
| JP | 2008-512904 A | 4/2008 |
| WO | 2006029263 A2 | 3/2006 |

OTHER PUBLICATIONS

Le, Huy-Binh, et al. "A Long Reset-Time Power-On Reset Circuit With Brown-Out Detection Capability". IEEE Transactions on Circuits and Systems II: Express Briefs. vol. 58, No. 11. Nov. 2011. IEEE. pp. 778-782. (Year: 2011).*

*Primary Examiner* — Thomas J Cleary
(74) *Attorney, Agent, or Firm* — Global IP Counselors, LLP

(57) ABSTRACT

An optical transceiver that shortens an elapsed time for loading data from an external device, and a method of loading data are disclosed. The optical transceiver includes an inner memory, a central processing unit (CPU), and a serial communication line connecting the CPU with the external device. The CPU actively loads data stored in the external device into the inner memory through the serial communication line by operating as a master device in the serial communication line.

2 Claims, 23 Drawing Sheets

(51) Int. Cl.
*H04B 10/40* (2013.01)
*G06F 13/38* (2006.01)

(58) Field of Classification Search
CPC ...... G06F 13/4063; G06F 13/42; G06F 1/266;
G06F 13/4234; H04B 10/1149; H04B 10/40
See application file for complete search history.

(56) References Cited

U.S. PATENT DOCUMENTS

| | | | | |
|---|---|---|---|---|
| 2005/0243408 A1* | 11/2005 | Dybsetter | ............... | H04B 3/56 359/341.1 |
| 2005/0244163 A1* | 11/2005 | Hofmeister | ............ | H01S 5/026 398/135 |
| 2005/0286902 A1* | 12/2005 | Pierce | ................... | H04B 10/40 398/139 |

* cited by examiner

OPTICAL TRANSCEIVER AND METHOD OF DOWNLOADING DATA

CROSS REFERENCE TO RELATED APPLICATION

The present application claims the benefit of priority of Japanese Patent Application No. 2016-158593, filed on Aug. 12, 2016, which is incorporated herein by reference.

BACKGROUND OF THE INVENTION

1. Field of the Invention

The present invention relates to an optical transceiver applicable to an optical communication system and a method of loading data into an inner memory.

2. Background Arts

The optical communication system implements an optical transceiver as one of elements constituting system, where the optical transceiver converts an electrical signal coming from a host system into an optical signal to be output therefrom and also converts an optical signal into an electrical signal output to the host system. Such an optical transceiver usually implements an inner memory that stores initial data for mutually converting between electrical signals and optical signals and for transmitting/receiving the signals, and programs for controlling and diagnosing the optical transceiver, a central processing unit (CPU) that fetches the initial data and program from the inner memory and executes the programs. The inner memory inevitably requires for the data and program to be loaded therein after the completion of the assembly of the optical transceiver. For instance, the initial data and program is loaded through a serial communication bus for controlling and monitoring the optical transceiver by the host system. Japanese Patent Applications laid open numbers thereof JP2008-512904 and JP2006-101435A have disclosed such an optical transceiver and a method of loading the data and program into the inner memory.

The methods disclosed therein inevitably requires overhead to be communicated with the host system in the loading of the data into the inner memory through the serial bus, which consumes substantial time depending on a size of the data and program to be loaded.

SUMMARY OF THE INVENTION

An aspect of the present invention relates to an optical transceiver that performs a mutual conversion between an electrical signal and an optical signal. The optical transceiver of the embodiment includes an inner memory, a central processing unit (CPU), and a first serial interface. The inner memory which is provided in the optical transceiver, stores a data and program loaded from an external device. The CPU controls the mutual conversion by the data and program stored in the inner memory. The CPU communicates with the external device through the first serial interface. A feature of the optical transceiver of the present invention is that the CPU loads the data and program from the external device through the first serial interface as a master device in the first serial interface, and loads the data and program into the inner memory.

Another aspect of the present invention relates to a method of loading a data and program in an optical transceiver, where the optical transceiver may mutually convert signals between an electrical form and an optical form. The optical transceiver provides an inner memory that stores the data and program, a CPU that controls the mutual conversion by the data and program in the inner memory, and a first serial interface that connects the CPU with an external device. The method of the invention includes steps of: (a) storing the data and program into the external device; (b) connecting the external device with the first serial interface; (c) loading the data and program through the first serial interface by the CPU operating as a master device for the first serial interface; and (d) loading the data and program read from the external device into the inner memory by the CPU.

BRIEF DESCRIPTION OF THE DRAWINGS

The invention will now be described by way of example only with reference to the accompanying drawings in which.

DESCRIPTION OF EMBODIMENT

Next, embodiment according to the present invention will be described as referring to drawings. In the description of the drawings, numerals or symbols same with or similar to each other will refer to elements same with or similar to each other without duplicating explanations.

First Embodiment

Architecture of an Optical Transceiver

An architecture of an optical transceiver of a general type, which is comparable to the optical transceiver according to the present invention.

Figure 17:
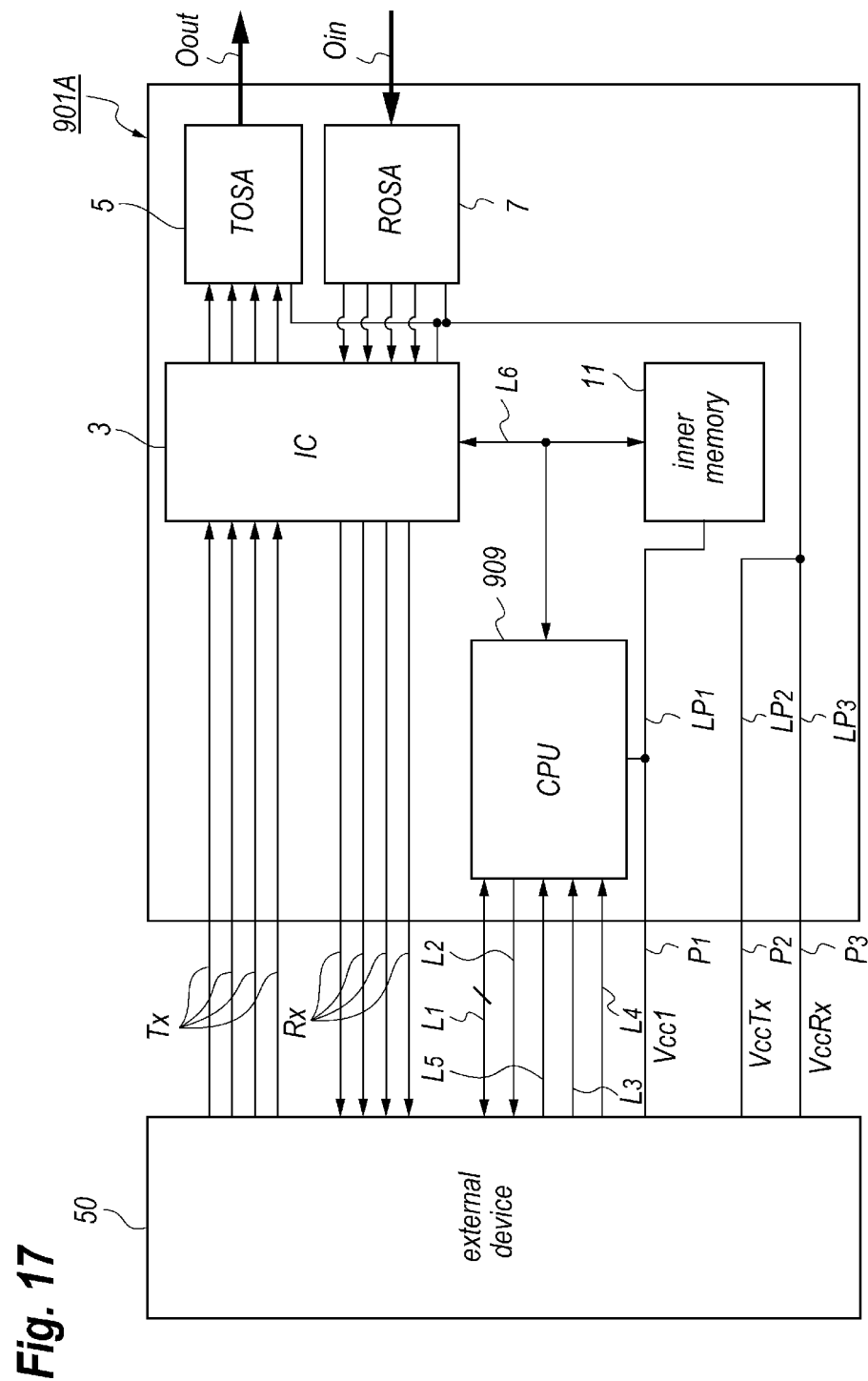
FIG. 17 shows a functional block diagram of a general optical transceiver.
Figure 19:
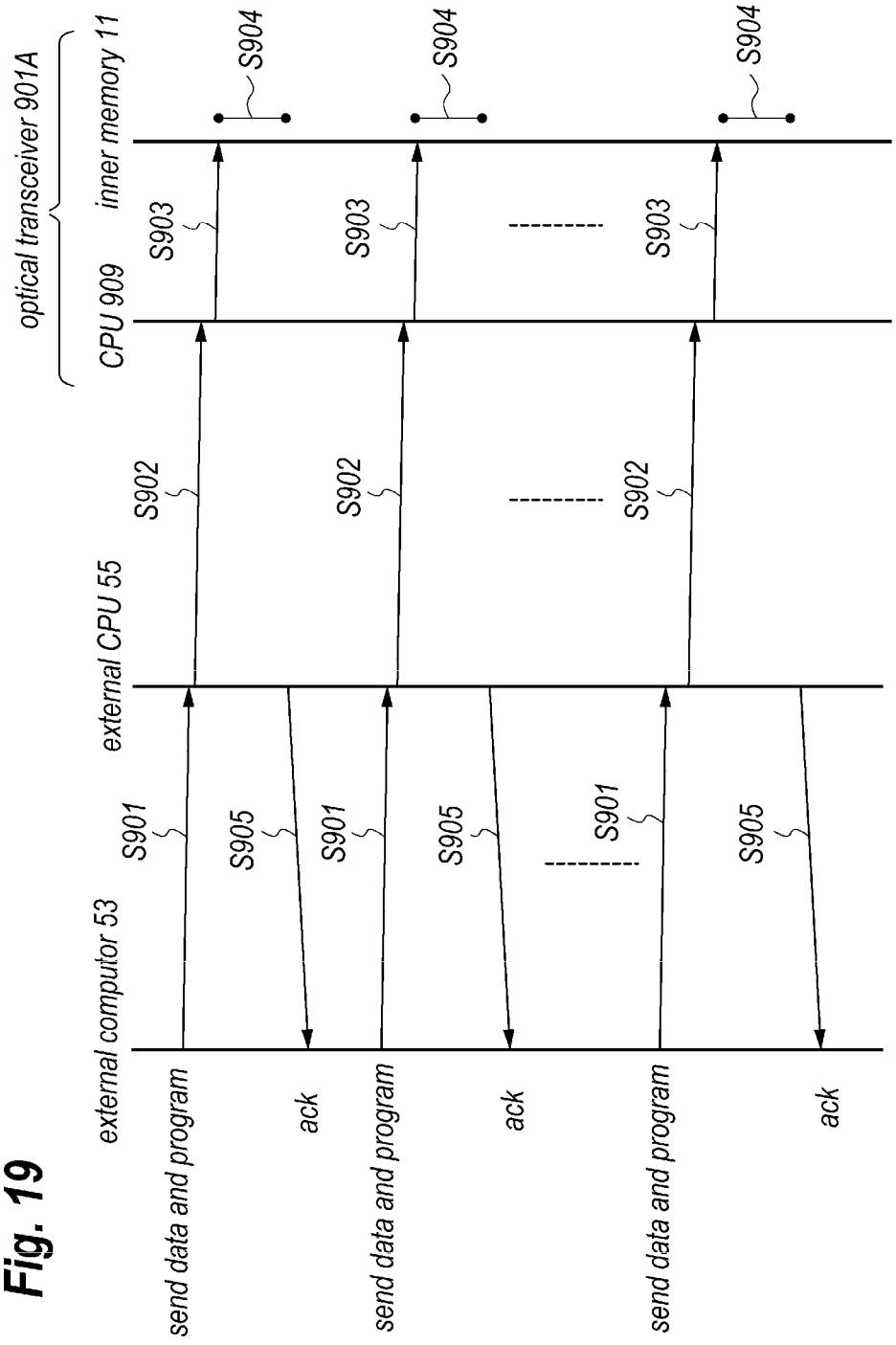
FIG. 19 shows sequence for loading the data and program from the external device into the optical transceiver shown in FIG. 17.

FIG. 17 shows a functional block diagram of the general optical transceiver 901A implemented within the optical communication system for transmitting/receiving optical signals. The optical transceiver 901A implements functions of the optical multiplexing, the optical de-multiplexing, and mutually converting between optical signals and electrical signals. The optical transceiver 901A may show the function of the 100 Gbps following one of multi-source agreements (MSA) concerning to the quad small form-factor pluggable 28 (QSFP28). As shown in FIG. 19, the optical transceiver 901A, which may communicate with the host system 50 through communication buses, provides an integrated circuit (IC) 3, a transmitter optical sub-assembly (TOSA) 5, a receiver optical sub-assembly (ROSA) 7, a central processing unit 909, and a built-in memory 11.

The TOSA 5 implements four (4) laser diodes (LDs) generating four optical signals corresponding to four lanes and an optical multiplexer, where a term "lane" means a transmission path for transmitting an optical signal and an electrical signal, and a plural lanes means paths arranged parallel to each other and transmitting respective signals independently. The TOSA 5 generates four lanes of optical signals from four lanes of electrical signals provided from a host device 50, and multiplexes those four optical signals into an optical output signal Oout. The ROSA 7 includes an optical de-multiplexer, which receives an optical input signal Oin and de-multiplexes the optical input signal Oin into four lanes of de-multiplexed optical signals, and four (4) photodiodes (PDs) that receive four lanes of the de-multiplexed optical signals and generate four lanes of electrical signals.

The IC 3 may include a clock data recovery (CDR), a laser diode driver (LDD), a trans-impedance amplifier (TIA), and so on. The LDD generates driving signals from the four (4) lanes of the electrical signals Tx, where the driving signals may modulate the four (4) LDs in the TOSA 5. The TIA may convert photocurrents generated by four (4) PDs in the ROSA 6 into voltage signals and amplifies thus converted voltage signals to the electrical signals Rx. The CDR may reshape the electrical signals Tx coming from the outside of the optical transceiver 901A and also the electrical signals coming from the TIA to generate the electrical signal Rx to the outside of the optical transceiver 901A. The LDD, the TIA, and the CDR in the IC 3 are configured with respective four (4) lanes corresponding to the four lanes of the electrical signals, Tx and Rx. The IC may further include a multiplexer and a de-multiplexer that mutually convert the electrical signals, Tx and Rx, by a ratio of n:m. That is, the additional circuit may convert the four lanes of the electrical output signals Rx into, for instance, 10 lanes of signals each having transmission speed slower than that for the electrical signals Rx.

The inner memory 11, which may be a type of nonvolatile memory such as electrically erasable programmable read-only memory (EEPROM), may store at least one of the data and program. The inner memory 11 is connected with the IC 3 and the CPU 909 but operable independent of the IC 3 and the CPU 909. Specifically, the inner memory 11 may store a firmware and data each necessary for operating the CPU 909. The inner memory 11 is connected with the IC 3 and the CPU 909 through a serial interface such as serial peripheral interface (SPI), inter-integrated circuit (I2C), and so on.

The CPU 909 may be a type of logic device such as one-chip micro-controller, field programmable gate array (FPGA), complex programmable logic device (CPLD), and so on, or a combination thereof. The CPU 909 may control and diagnose the operation of the CPU 909 by executing a microprogram as referring to data, the microprogram and the data are stored therein or in the inner memory 11. Also, the CPU 909 is connected with the external host device 50 through a serial interface $L_1$ of, for instance, the I2C interface. Thus, the external host device 50 may control, monitor, and diagnose the optical transceiver 901A through the serial interface $L_1$. The CPU 909 also provides other communication lines, $L_2$ to $L_5$, where the line $L_2$ sends an alarm from the CPU 909 to the host system 50, the line $L_3$ changes the output optical power of the CPU 909, the line $L_4$ resets the CPU 909, and the line $L_5$ selects the serial signal. The line $L_2$ is sent from the CPU 909 to the host device 50, while, rest of lines, $L_3$ to $L_5$, are sent from the host device 50 to the CPU 909. The optical transceiver may further provide an inner serial interface $L_6$ such as the SPI that connects the IC 3 and the inner memory 11.

Figure 18:
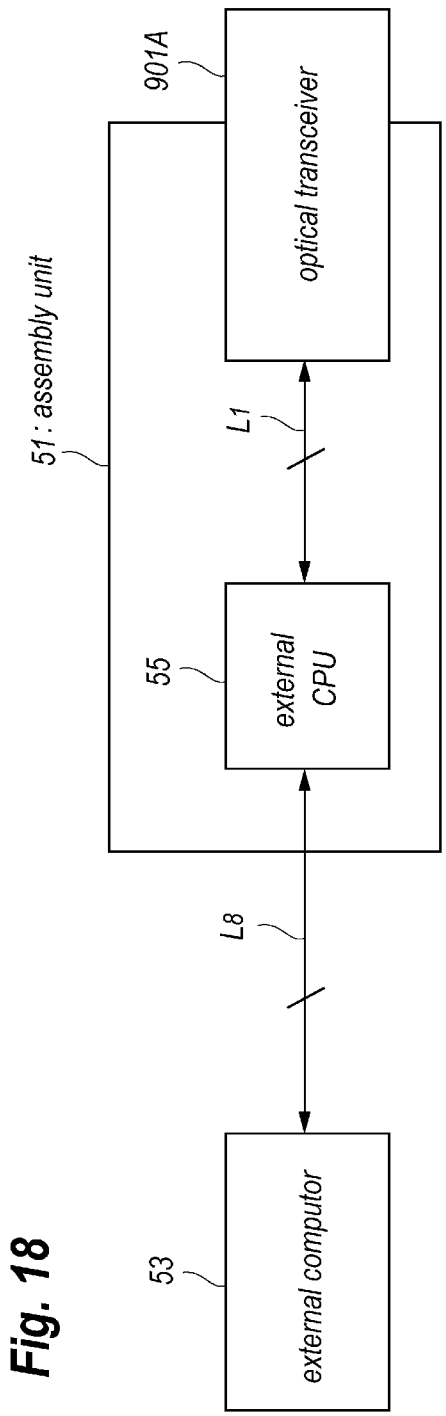
FIG. 18 shows a connection diagram for loading the data and program from the external computer to the external CPU of the optical transceiver shown in FIG. 17.

Procedures for loading the data and program into the inner memory 11 in an optical transceiver 901A will be described, which is comparable to the present invention. In order to load the data and program into the inner memory 11, one technique may be considered where an inner memory 11 which the programs and the data are stored therein in advance to be practically installed within the optical transceiver 901A is prepared, then, installs the inner memory 11 onto an assembly unit of the optical transceiver 901A. However, another method, where the programs and the data are loaded in the inner memory 11 as the inner memory 11 is installed on the assembly unit, is preferable and convenient because of a repeatable process. That is, the procedures of loading the programs and the data into the inner memory 11 using the setup shown in FIG. 18 are preferable. That is, an assembly unit 51 is prepared, where a CPU 55 and the optical transceiver 901A are installed thereon for converting data. The CPU 55 and the optical transceiver 901A are able to communicate through the I2C interface $L_1$ and the CPU 55 is coupled with an external computer 53, such as a personal computer, through another communication line $L_8$ configured with, for instance, the universal asynchronous receiver transmitter (UART). In such a setup, the external computer 53 may send the data held thereby to the CPU 55 through the UART line $L_8$. The CPU 55 may convert the data thus transferred from the external computer 53 into the I2C format and send the converted data and program to the CPU 909 in the optical transceiver 901A through the I2C interface $L_1$. The CPU 909 may write (store) the data and program sent from the CPU 55 into the inner memory 11 through the internal bus $L_6$. Thus, the inner memory 11 may store the data and program through the CPU 909 in the optical transceiver 901A. In an alternative, the external CPU 55 may receive the data from the external computer 53 through the universal serial bus (USB) as interposing a circuit that converts the USB format into the UART format.

FIG. 19 shows sequence for loading the data and program from the external device into the inner memory 11 of the optical transceiver 909. The external computer 53 sends using the UART interface $L_8$ the data and program to the external CPU 55 by dividing the data and program into respective blocks each having a size defined by the UART format, which may be, for instance, 256 bytes, which is denoted as step S901 in FIG. 19. The external CPU 55 transfers the sent data and program to the CPU 909 as converting the format of the data and program from the UART format into the I2C format at step S902. The CPU 909 extracts the data and program from the I2C format and writes (stores) the extracted data and program into the inner memory 11 through the inner serial interface $L_6$ at step S903. After a preset waiting, for instance about 5 msec waiting ate step S904, the external CPU replies "ack" to the external computer 53 at step S905, which means that the external CPU 55 is ready for receiving a next block of the data and program. Steps, S901 to s905, are iterated until all blocks of the data and program are loaded into the inner memory 11. For instance, when the data and program to be loaded in the inner memory usually has a total size of exceeding 128 kbytes, which is far greater than the size of one block, for instance, 256 bytes; that is, the external computer 53 inevitably divides the data and program into several hundreds of the blocks and iterates the load procedures of steps, S901 to s905, several hundreds of times. The load of the data and program into the inner memory 11 from the CPU 909 may be carried out by a format following the inner serial interface $L_6$, which usually has a size of the block greater than that of the UART format and the I2C format.

Next, architecture of an optical transceiver according to the first embodiment of the present invention will be described.

Figure 1:
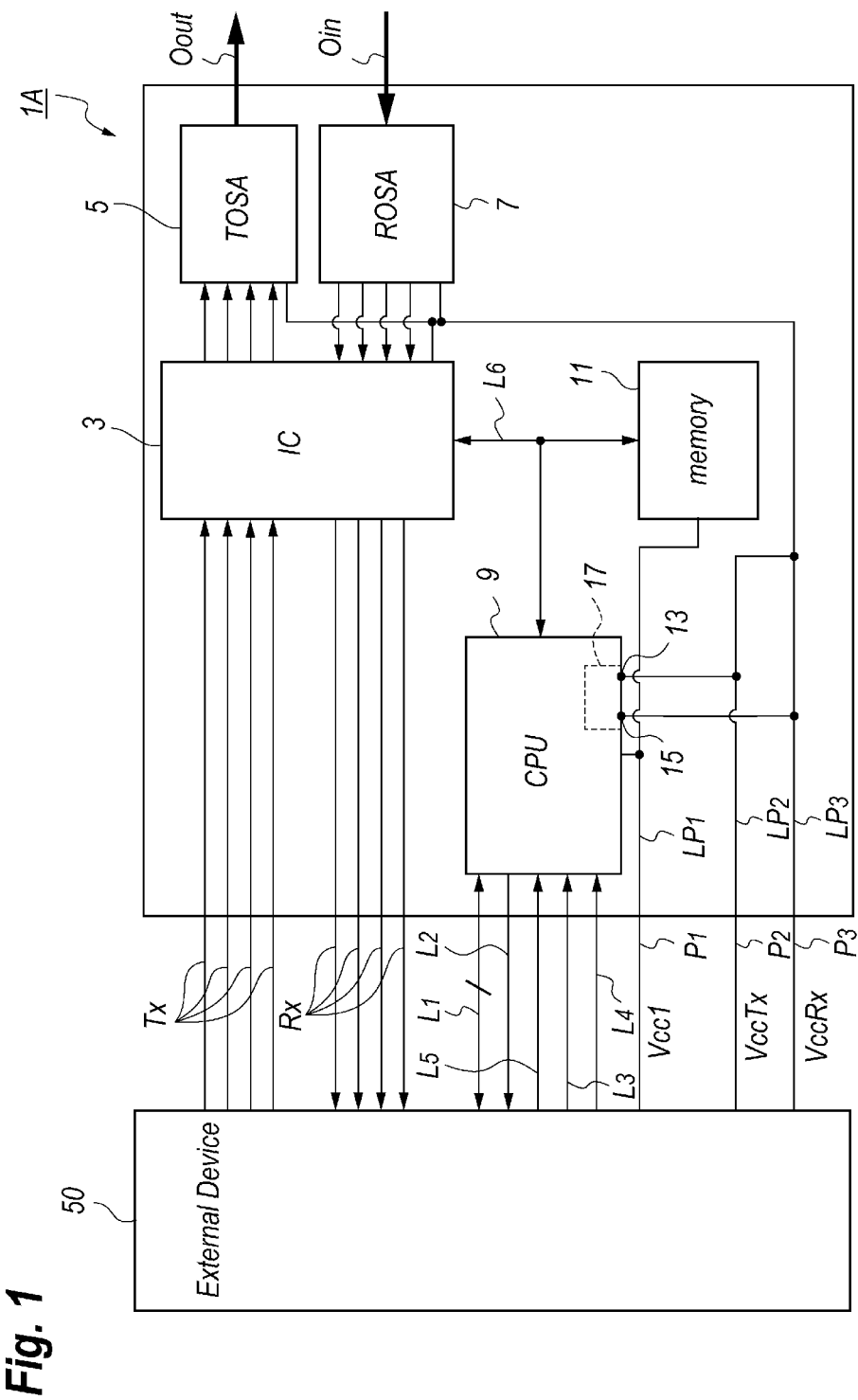
FIG. 1 schematically shows a functional block diagram of an optical transceiver according to the first embodiment of the present invention.

FIG. 1 schematically shows a functional block diagram of an optical transceiver 1A according to the first embodiment of the present invention. Description below concentrates on points distinguishable from those of the optical transceiver 901A shown in FIG. 17 which is comparable to the present optical transceiver 1A. The conventional optical transceiver 901A shown in FIG. 17 provides power supply lines, $P_1$ to $P_3$. The power supply line $P_1$ supplies the power Vcc1 to the CPU 909, the inner memory 11, and so on through the inner power line $LP_1$. The power supply line $P_2$ supplies the power VccTx to units for the optical transmission including the TOSA 5, the IC 3, and so on through the inner power line $LP_2$. The last power supply line $P_3$ supplies the power VccRx to units for the optical reception including the ROSA 7, the IC 3, and so on through the inner power line $LP_3$. When the optical transceiver 901A normally operates, those inner power lines, $LP_1$ to $LP_3$, are externally set to be 3.3 V. In the optical transceiver 1A of the embodiment, the CPU 9 further provides input ports, 13 and 15, connected to the inner power lines, $LP_2$ and $LP_3$, respectively. The CPU 9 also includes an analog-to-digital converter (A/D-C) 17, and captures levels of the inner power lines, $LP_2$ and $LP_3$, through the input ports, 13 and 15, and the A/D-C 17 to monitor the power, VccTx and VccRx. In an alternative, the CPU 9 may have a function to monitor at least one of the power, VccTx and VccRx. Other functions of the CPU 9 are substantially same with those of the CPU 901A.

Figure 2:
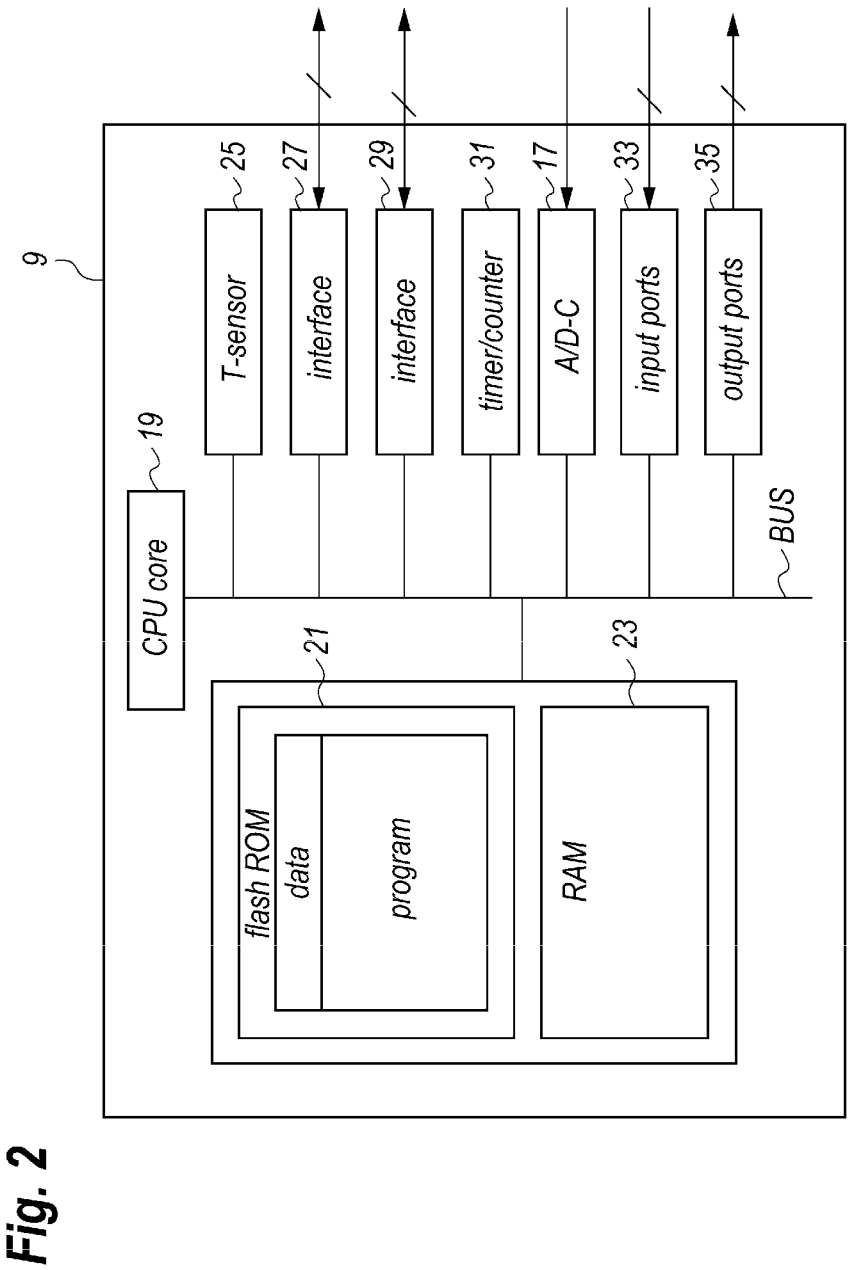
FIG. 2 schematically shows a functional block diagram of a central processing unit (CPU) implemented within the optical transceiver shown in FIG. 1.

FIG. 2 schematically shows a functional block diagram of the CPU 9 implemented within the optical transceiver 1A. The CPU 9 of the embodiment includes a CPU core 19, a flash ROM 21, a random access memory (RAM) 23, a temperature sensor 25, interfaces, 27 and 29, a timer and counter 31, the A/D-C 17, input ports 33, output ports 35, and an internal bus BUS. The flash ROM 21 stores the program executed by the CPU core 19 and the data referred during the execution. The size of the flash ROM 21 is usually smaller than the size of the program and the data to be loaded from the external device 50. The CPU 9 may implement a flash ROM whose size is greater than a size of the data and program to be loaded from the external device 50. However, such a CPU with an extreme size of a flash ROM possibly has dimensions two or three times greater than that of the CPU 9 with a limited size of the flash ROM 21. Such an expanded CPU is hard to be installed within a housing whose outer dimensions are severely determined by the standard of, for instance, QSFP28 described above. Accordingly, the embodiment of the present invention primarily assumes that a CPU to be installed has a size of several millimeters square with a relatively lessor integration, and the built-in flash ROM 21 has a size smaller than the size of the loaded data and program.

Procedures of Loading Data and Program

Next, procedures of loading data into an inner memory 11 of the optical transceiver 1A will be described.

Figure 3:
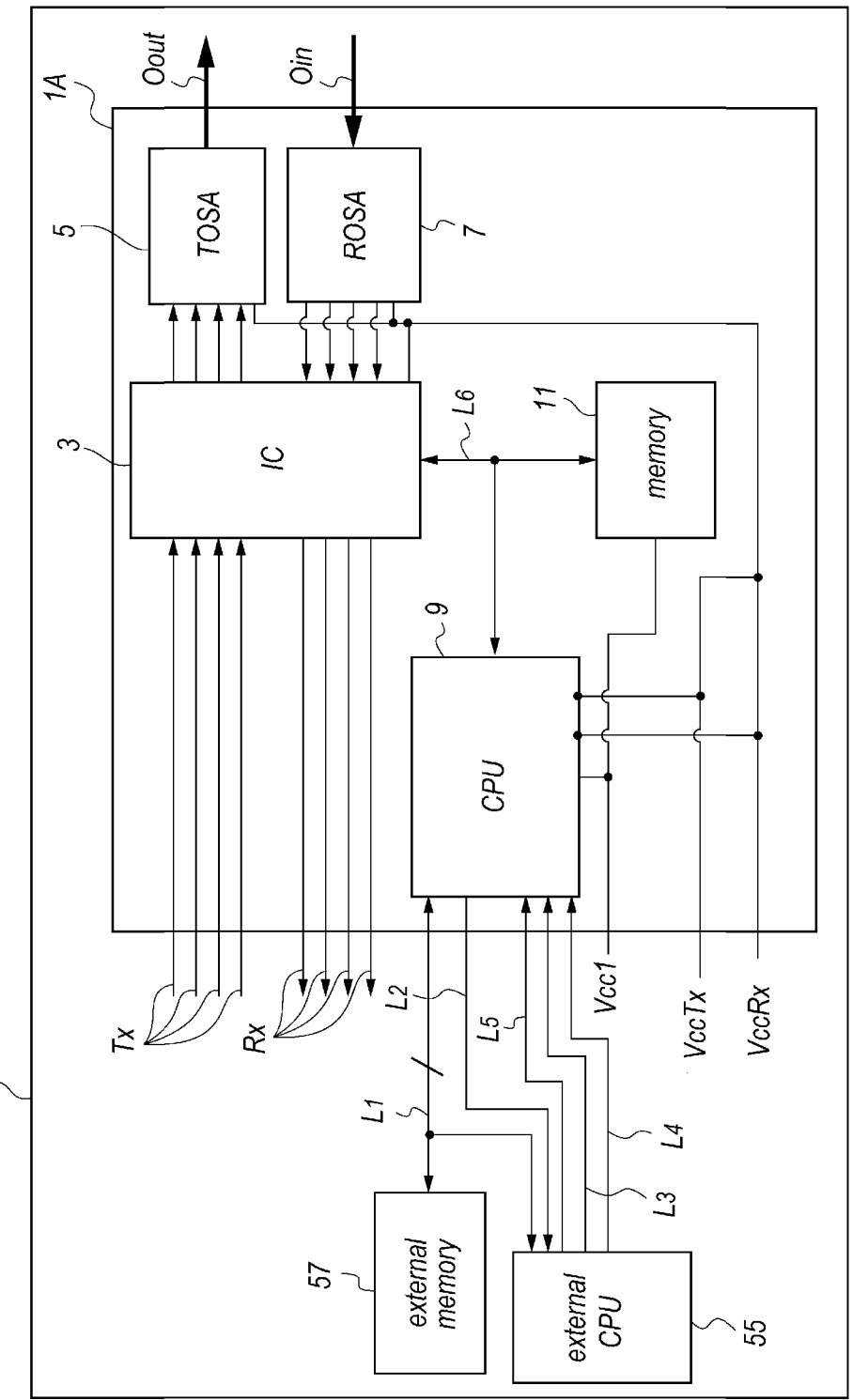
FIG. 3 schematically shows a setup for loading the data and program into the inner memory of the optical transceiver.
Figure 4:
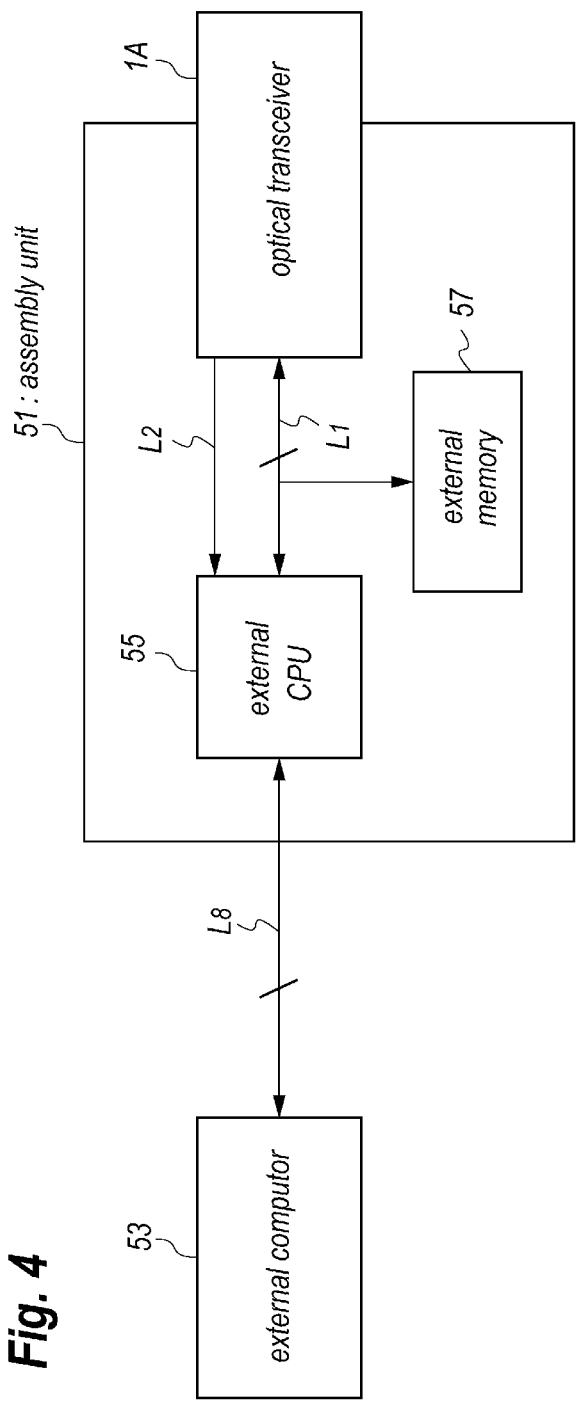
FIG. 4 shows a connection diagram outside of the optical transceiver when the data and program are loaded into the inner memory.

The load of the data and program in the inner memory 11 in the optical transceiver 1A of the present embodiment may be carried out by a setup whose functional block diagram is shown in FIGS. 3 and 4. First, the assembly unit 51 is prepared, on which the CPU 55 for converting the format of the data and program, the optical transceiver 1A, the external memory 57 type of, for instance EEPROM, and so on are mounted. The CPU 55, the external memory 57, and the optical transceiver 1A are connected with the I2C interface $L_1$ on the assembly unit 51. Also, the CPU 55 is coupled with the optical transceiver 1A through the communication line $L_2$ for sending data from the optical transceiver 1A to the CPU 55, and the CPU 55 is coupled with the external computer through the UART interface $L_8$. The external computer 53 may send the data and program to the CPU 55 through the UART interface $L_8$. The CPU 55 may convert the format of the data and program, which is sent from the external computer 53, from the UART format to the I2C format. The data and program coming from the external computer 53 may be stored into the external memory 57. Because the external memory 57 is out of the optical transceiver 1A, the external memory 57 has no restriction in sizes thereof, and may have an enough space for storing a whole of the data and program to be loaded. The CPU 9 in the optical transceiver 1A has a function to actively read the data and program from the external memory 57 and set thus read data into the inner memory 11.

The meaning of the active read by the CPU 9 is that the CPU 9 reads the data and program operable as a master device in the I2C interface $L_1$ from the external memory 57 operating as a slave device on the I2C interface $L_1$, or the CPU writes (stores) the data and program as a master device of the inner serial interface $L_6$ into the inner memory 11 operating as a slave device in the serial interface $L_6$. More specifically, the CPU 9 reads (receives) one of data blocks that constitutes the data and program from the external memory 57 and writes (sends) the one of the data blocks into the inner memory 11 by controlling the external memory 57 through the I2C interface $L_1$ and the inner memory 11 through the inner serial interface $L_6$, respectively. Then, the CPU 9 reads (receives) the next one of the data blocks from the external memory 57 and writes (sends) the next one of the data blocks into the inner memory 11. The CPU 9 repeats the reading and the writing until the last one of the data blocks has been stored in the inner memory. The CPU 9 may perform the receiving a new data block from the external memory 57 and the writing a previous data block into the inner memory 11 concurrently. The external memory 57 may store the firmware for the CPU 9 in the optical transceiver 1A instead of the data and program, or in addition thereto. The CPU 9 may store the firmware into the inner memory 11 instead of the data and program, or in addition thereto. The store of the data and program into the external memory 57 from the external computer 53 is unnecessary to be carried out synchronous with the store of the data and program into the inner memory 11. That is, the assembly unit 51 may mount two or more optical transceiver and one external memory 57 that stores the data and program. The only external memory 57 may be commonly operable to inner memories 11 implemented within optical transceivers mounted on the assembly unit 51. The external computer 53 and the CPU 55 are required for the first load of the data and program into the external memory 57, and may be disconnected with the assembly unit 51. That is, the assembly unit 51 only implements the external memory 57 that stores the data and the optical transceiver 1A coupled with the external memory 57 through the serial interface $L_1$.

Figure 5:
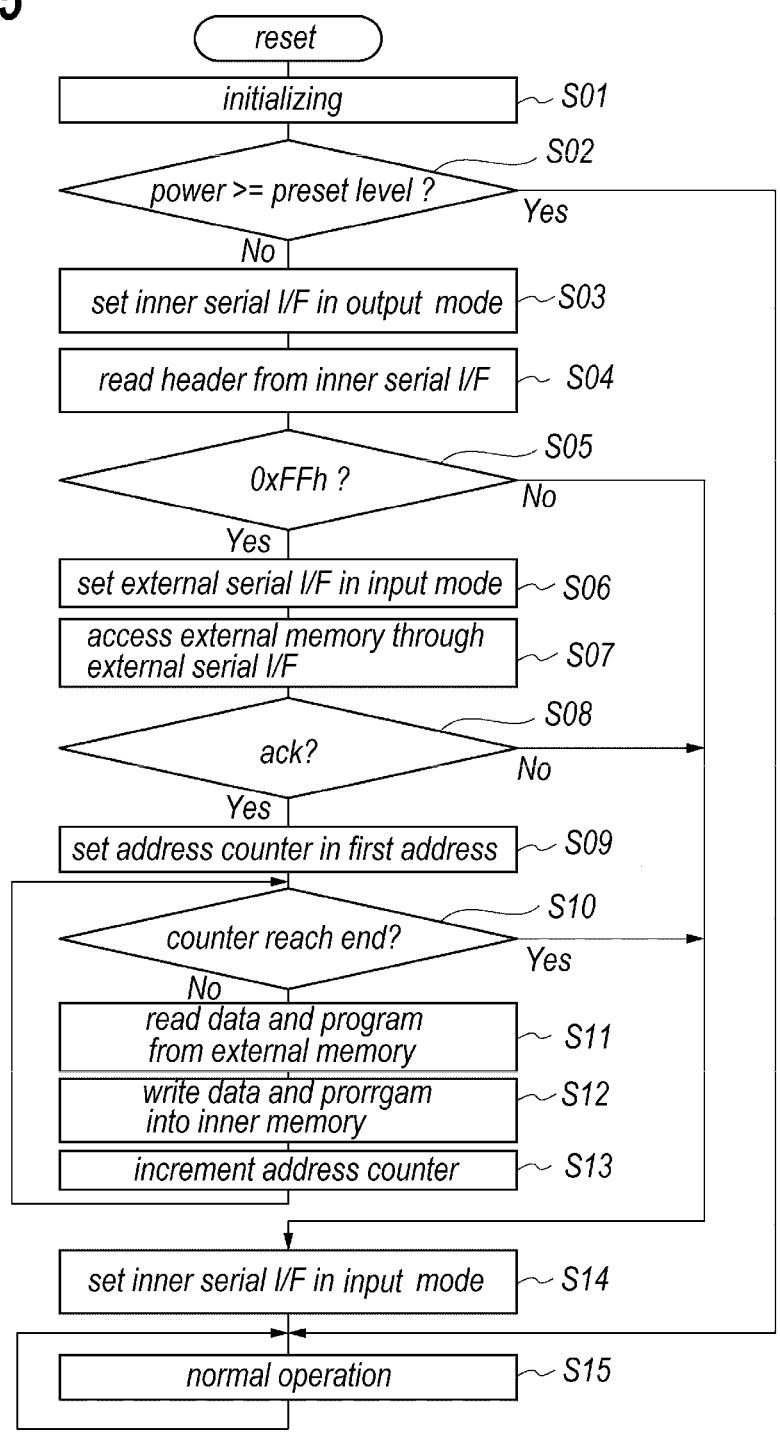
FIG. 5 is a flow chart showing procedures of loading the data and program into the inner memory.

FIG. 5 is a flow chart showing procedures of loading the data and program into the inner memory 11. Being externally triggered by the reset for the CPU 9, the CPU 9 begins the initializing process at step S01. In the initializing, the CPU 9 sets the serial port connected to the inner serial interface $L_6$ as the input port. Then, monitoring at least one of the power, VccTx and VccRx, the CPU 9 decides whether a monitored power exceeds the designed voltage, which may be, for instance, 2.8 V at step S02. When the monitored power does not satisfy the condition, which corresponds to "No" at step S02, that is, at least one of the power, VccTx and VccRx, is lower than the designed level, the CPU 9 moves the write mode by which the data is written into the inner memory 11. The write mode never occurs during a normal operation where the optical transceiver 1A transmits and receives optical signals and all of the power, Vcc1, VccTx, and VccRx, are set to be in the designed level. A status where, even the power Vcc1 is set to be in the designed voltage, at least one of the power, VccTx and VccRx, is lowered from the designed level never occurs in the normal mode. However, during the production of the optical transceiver 1A, such an extraordinary level may be set in at least one of the power, VccTx and VccRx, the optical transceiver 1A may be triggered by the detection of such a lowered level for loading the data and program into the inner memory 11. In the write mode, the CPU 9 first changes the serial interface thereof connected to the inner serial interface $L_6$ in the output mode at step S03. Thus, the CPU 9 is operable as a master device in the inner serial interface, which may be, what is called as the SPI interface, and the inner memory 11 becomes operable as a slave device for the SPI interface.

Then, the CPU 9 reads a header data at the first address of the inner memory 11 through the inner serial interface $L_6$, where the header data may be, for instance, the first 16 bytes data, and the CPU 9 checks whether the header data has a pattern of, for instance, 0xFFh, at step S05, where "0x" in the head and "h" in the last denote that symbols therebetween are expressed by the hexadecimal code. The decision above corresponds to a case where the inner memory 11 already stores the data and program. For instance, the inner memory 11 stores 0xFFh in all addresses thereof at the initializing, and the data and program to be stored in the inner memory 11 has a pattern difference form 0xFFh in the first address; steps S04 and S05 may decide whether the inner memory 11 already stores the data and program or not. The description below assumes that the first data is not 0xFFh; however, the data and program has a specific address different from the header address to be checked by the CPU 9 for deciding whether the data is already stored in the inner memory 11 or not.

When the first address has the pattern 0xFFh, which corresponds to Yes at step S05, the CPU 9 sets the serial port thereof connected to the external serial interface $L_1$ to the input port, which means that the CPU 9 becomes operable as a master device for the serial interface $L_1$, at step S06. Then, the CPU 9 accesses the external memory 57 at step S07. Receiving a response from the external memory 57, which corresponds to "Yes" at step S08, the CPU 9 resets the address counter that stores the first address to be read in the external memory 57 at step S09. Then, the CPU 9 iterates steps S11 to S13 until the address counter becomes the end address that corresponds to the size of the data and program to be loaded at step S10.

Specifically, the CPU 9 iteratively reads the data and program with a preset size, for instance, 256 bytes, from the external memory 57 from the address indicated by the address counter and receives through the serial interface $L_1$ at step S11. In the serial communication between the CPU 9 and the external memory 57 on the serial interface $L_1$, for instance, the I2C interface, the CPU 9 is operable as the master device. While, the optical transceiver 1A connected to the host device 50 through the serial interface $L_1$ during the normal operation, the CPU 9 in the optical transceiver 1A operates as a slave device and the host device 50 operates as the master device. In the present embodiment, the CPU 9 may operate in the serial communication on the serial interface $L_1$ as the master device during the load of the data and program. Thus, the master device in the serial interface $L_1$ is different in the normal mode and the write mode. Receiving the data and program of the preset size by the CPU 9, the CPU 9 stores thus received data and program into the inner memory 11 through the inner serial interface $L_6$ at step S12. Then, the CPU 9 increases the address counter thereof by the preset size at step S13.

When both of the power, VccTx and VccRx, satisfies the condition at step S02, which corresponds to Yes at step S02, the CPU 9 moves to the normal mode at which the CPU 9 diagnoses and controls the operation of the optical transceiver 1A. The normal mode iterates the monitor of various statuses in the optical transceiver 1A and the check whether the monitored statuses are in an alarm status or not at step S15 by a simple loop or a time sharing using an internal timer. When step S05 detects that the first data is not the designed pattern, which corresponds to No, step S08 detects no response, which corresponds to also No, or step S10 detects that the address counter reaches the end address, which corresponds also to No; the CPU 9 changes the input port thereof connected to the inner serial interface $L_6$ to the input port and moves to the normal mode.

While the CPU 9 stores the data ad program into the inner memory 11, that is, the CPU 9 is in the write mode, the CPU 9 sets the output port thereof connected to the communication line $L_2$ to a preset voltage level, for instance HIGH level, which indicates that the CPU 9 is in the write mode. When the optical transceiver 1A is mounted on the assembly unit 51, the electrical input signal Tx and the optical input signal Oin are absent, the CPU 9 detects a state of Loss-of-Signal in those inputs. When the IC 3 detects those statuses, the IC 3 may be operable even when the power, VccTx and VccRx, are less than the designed voltage, or the IC 3 is supplied with the power Vcc1 and operable concurrently with the inner memory 11. The CPU 9 sets the output port thereof connected to the communication line $L_2$ in a level that denotes the CPU 9 is not in error from another level that denotes the CPU 9 is in error during transition to the write mode. Thus, the CPU 9 may send the status that the CPU 9 is in the write mode through the serial communication line $L_2$ to the external CPU 55, which means that the external CPU 55 may be prevented to access the optical transceiver 1A through the serial interface. Also, when the external CPU 55 is coupled with the external computer 50, the CPU 9 may indicate thereto that the CPU 9 is under loading the data and program into the inner memory 11.

Figure 6:
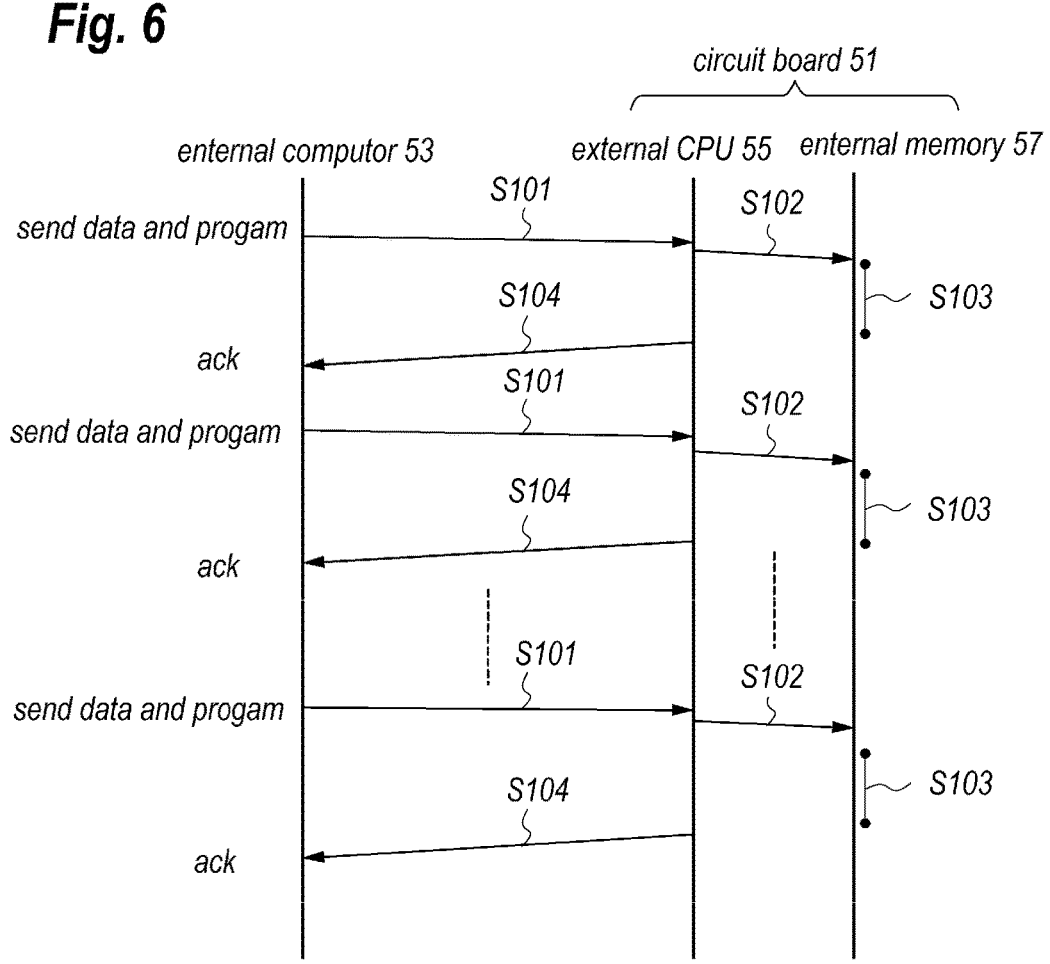
FIG. 6 shows sequence for loading the data and program from the external computer into the external memory under the control of the external CPU.

FIG. 6 shows sequence for loading the data and program from the external computer 53 into the external memory 57 under the control of the external CPU 55. Assuming the data is divided into the blocks each having a size of 256 bytes, the external computer 53 sends the first block through the UART interface at step S101. The CPU 55 converts the first block from the UART format to the I2C format, and stores thus converted first block into the external memory 57 through the inner serial interface $L_1$ at step S102. Waiting for a preset time, for instance 5 milliseconds at step S103, the CPU 55 sets ACK to the external computer 53 at step S104 that means the reception of the first block is completed. Steps 101 to 104 are iterated until the transfer of all blocks of the data and program are completed.

Figure 7:
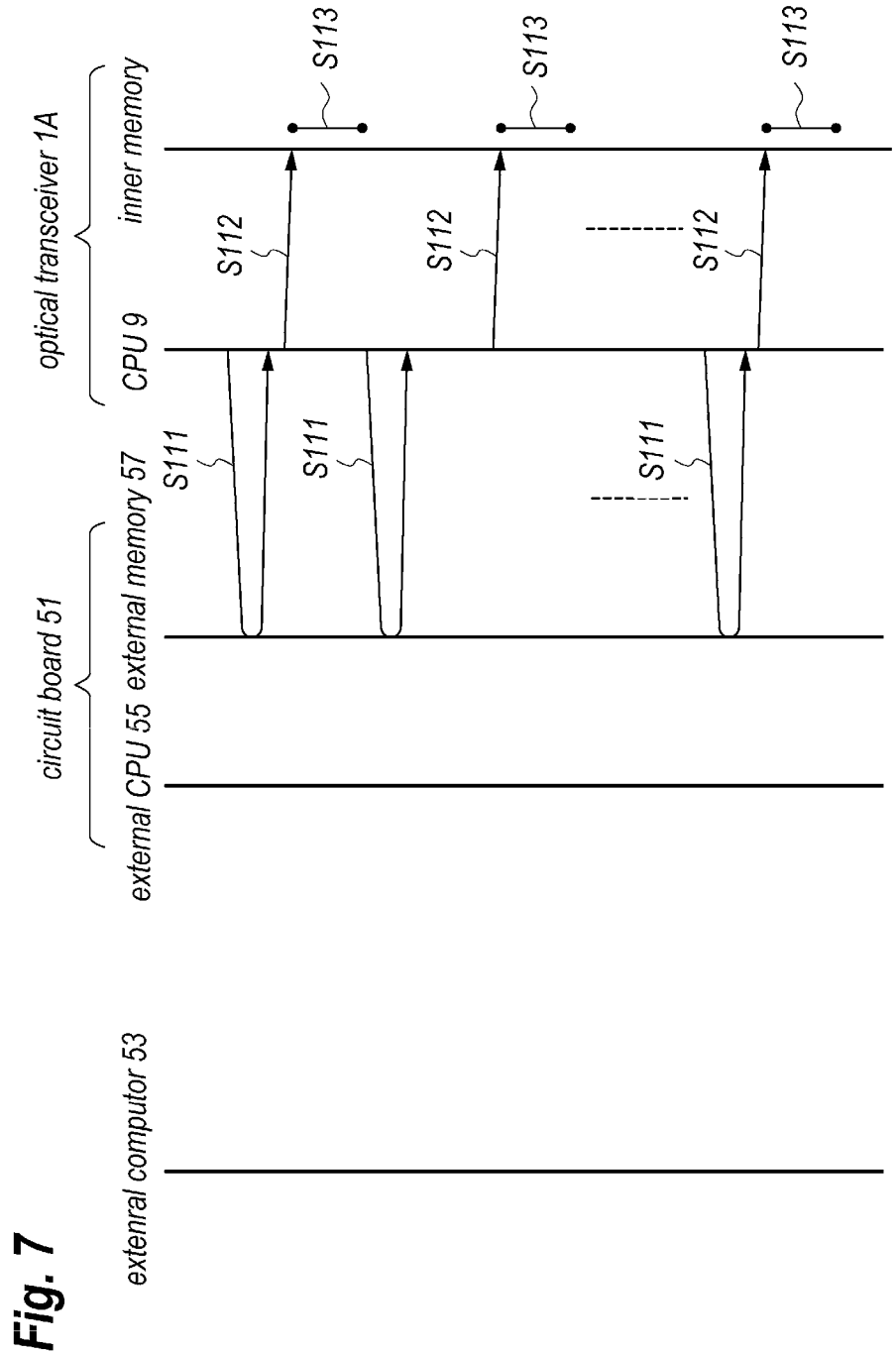
FIG. 7 shows sequence for loading the data and program temporarily stored in the external memory into the inner memory.

FIG. 7 shows sequence for loading the data and program temporarily stored in the external memory 57 into the inner memory 11. In the write mode, the CPU 9 that is operable as the master device reads the data and program by the preset size, for instance 256 bytes, from the external memory 57 that is operating as the slave device at step S111; then the CPU 9 stores thus read data and program with the preset size into the inner memory 11 that is also operable as a slave device at step S112. Thereafter, the CPU 9 waits for a preset time, for instance 5 milliseconds at step S113. Steps S111 to S113 are iterated until the all data and program is stored into the inner memory 11.

Next, some advantages of the optical transceiver 1A and the procedures of loading the data and program for the optical transceiver 1A will be described.

Detecting the external memory 57 by the CPU 9 through the serial interface $L_1$, the CPU 9 actively reads the data from the external memory 57 and actively stores thus read data and program into the inner memory 11, where the active function of the CPU 9, that is the active read and the active write, means that the CPU 9 operates as the master device in the serial interface $L_1$ and in the inner serial interface $L_6$. Thus, the CPU 9 may actively load the data and program into the inner memory 11 from the external memory 57 only by connecting the optical transceiver 1A with the external memory 57, which may save time at least required for the operation by the external CPU 55; accordingly, the time for loading the data and program into the inner memory 11 may be shortened.

Figure 8:
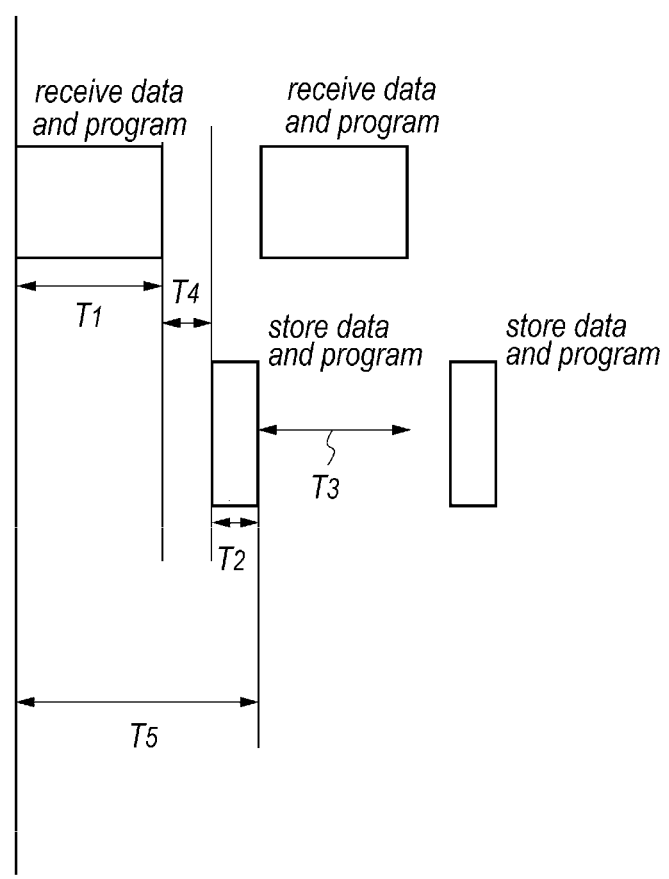
FIG. 8 is a time chart showing respective elapsed times for loading the data and program into the inner memory.
Figure 20:
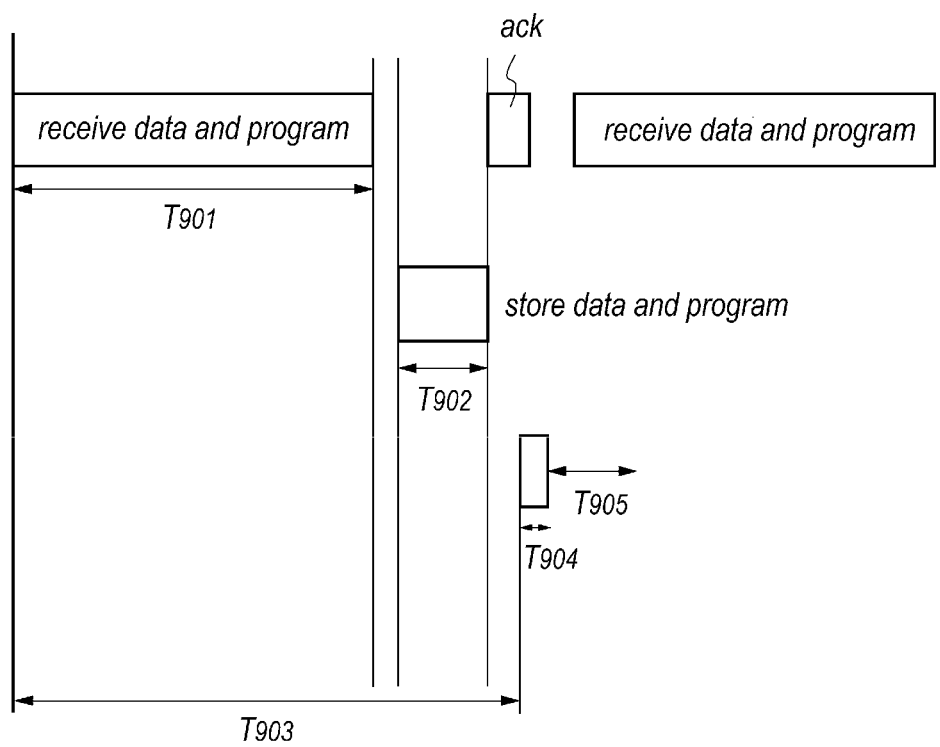
FIG. 20 shows an elapsed time for loading the data and program from the external device to the optical transceiver shown in FIG. 17.

Also, the CPU 9 begins the load operation triggered with the detection of the reduction in the level of at least one of the power, VccTx and VccRx; accordingly, the inner memory 11 may revise the data and program with the loaded data and program without preparing an additional signal line. The CPU 9 may detect the status of the inner memory 11, that is, whether the inner memory 11 already stores the data and program or not, and begin the load only when the inner memory 11 does not store the data and program yet. Thus, depending on how the inner memory 11 stores the loaded data and program, the CPU 9 may effectively begin the load only when the inner memory 11 is necessary to be revised by the loaded data and program. The optical transceiver 1A that is already revised in the inner memory 11 thereof by the loaded data and program is unnecessary to be loaded again. This configuration securely excludes such a surplus operation The effectiveness of the load for the inner memory 11 according to the present invention may be numerically evaluated. FIG. 20 shows a time chart regarding an elapsed time of the load to the inner memory 11 of the conventional optical transceiver 901A, while, FIG. 8 is a time chart for the optical transceiver 1A to load the data into the inner memory 11. Those time charts evaluate the elapsed time for loading one block of the data with 256 bytes.

Elapsed time for a conventional setup shown in FIG. 18 is first evaluated. The analysis below assumes that the format of the UART interface $L_6$ connecting the external computer 53 with the external CPU 55 adds a start bit and a stop bit in the head and the end, respectively, for every one byte data, the communication speed of 115200 bps (bit per second), and no parity. Then, the elapsed time $T_{901}$ for transmitting the data and program from the external computer 53 to the external CPU 55 is given by:

$$T_{901}=256 \text{ (byte)}\times(8 \text{ bit}+1 \text{ bit}+1 \text{ bit})/115200 \text{ bps}\sim22.2 \text{ msec.}$$

Practically, information of a header, a command, a size, and so on are added as the header data for every 256 bytes data, and another several bytes that includes a check bit and so on are added as the end data. Accordingly, the practical elapsed time $T_{901}$ becomes longer than the period estimated from the above equation. However, those additional data, namely, the header data and the end data are relatively small enough compared with the data and program to be transmitted and are ignorable.

After receiving the data and program from the external computer 53, the external CPU 55 transfers thus received data and program with the block size of 256 bytes to the CPU 909 implemented within the optical transceiver 901A. The serial communication between the external CPU 55 and the CPU 909 by the I2C interface inevitably adds a response of Ack/Nack with one bit for every 8 bits transaction; accordingly, assuming the transmission speed of the I2C interface to be 400 kbps, the time $T_{902}$ required for loading the data and program is estimated to be:

$$T_{902}=256 \text{ bytes}\times(8 \text{ bit}+1 \text{ bit})/400 \text{ kbps}\sim5.76 \text{ msec.}$$

The I2C format requires to transmit other data of the slave address, the memory address, the register address and so on, which becomes totally several bytes; accordingly, the elapsed time $T_{902}$ for transmitting the data and program becomes slightly longer than the above estimation. Because the additional time assigned to the information is considerably short compared with the time for transmitting the data and program, the analysis below may ignore those additional time. Also, the external CPU 55 is necessary to send ack of several bytes to the external computer 53 immediately after the transmission of the data and program for indicating that the transmission from the external computer 53 has normally completed. Assuming that the external CPU 55 is necessary to analyze the header of the data and program, and generate the end data for periods of 1 millisecond, respectively, the total elapsed time $T_{903}$ for transmitting the data and program with 256 bytes from the external computer 53 to the external CPU 55 becomes about 29.96 msec. Accordingly, in order to transmit the data and program of 128 kilobytes, which means the transmission of the blocks each having the size of 256 bytes is iterated by 512 times; the total elapsed time becomes about 15.3 seconds.

Moreover, the CPU 909 in the optical transceiver 901A is necessary to transmit the data and program, which comes from the external CPU 55, to the inner memory 11 through the inner serial interface $L_6$ such as the SPI interface after receiving the one block of the data and program. Assuming the transmission speed of the inner serial interface $L_6$ to be 8 Mbps, the elapsed time $T_{904}$ for the transmission from the CPU 909 to the inner memory 11 is estimated to be:

$$T_{904}=256 \text{ bytes} \times 8 \text{ bit}/8 \text{ Mbps} \sim 0.256 \text{ msec.}$$

Practically, the inner serial interface $L_6$ requires for setting the register address for the inner memory 11, which means that the elapsed time for the inner serial interface $L_6$ to transmit one block of the data becomes slightly longer than the above estimation. However, because those overheads are considerably smaller than the data and program, the analysis below ignores the overheads from the estimation. Also, the analysis is necessary to take the access time for the inner memory 11 into account, which may be about 5 msec at most. However, as FIG. 20 indicates, the elapsed time necessary for the transmission between the external computer 53 and the CPU 909 is dominant, and the elapsed time $T_{904}$ for the inner serial interface and the access time $T_{905}$ of the inner memory 11 are ignorable.

Next, the elapsed time of the present embodiment will be evaluated. Referring to FIG. 8, a time $T_1$, by which for the CPU 9 to load one block of the data and program with the size of 256 bytes from the external memory 57 through the I2C interface that has the speed of 400 kbps, is estimated to be:

$$T_1=256 \text{ bytes} \times (8 \text{ bits}+1 \text{ bit})/400 \text{ kbps} \sim 5.76 \text{ msec.}$$

Also, a time $T_2$ for the overheads, that is, an elapsed time $T_2$ for the CPU 9 to analyze the header of the data and transmit the data to the inner memory 11 becomes, assuming the transmission speed of 8 Mbps:

$$T_2=256 \text{ bytes} \times 8 \text{ bits}/8 \text{ Mbps}=0.256 \text{ msec.}$$

Although additional 5 milliseconds are necessary for the access time $T_3$ of the inner memory 11; writing the data within the inner memory 11 concurrently with reading of the data from the external memory 57 may omit the access time $T_3$. Assuming the overhead $T_4$ from the reading of the data and program from the external memory 57 to the beginning of the writing the data and program into the inner memory 11 to be 0.1 millisecond, the elapsed time $T_5$ for loading the data and program of 256 bytes into the inner memory 11 becomes about 6.116 msec, which means that the data of 128 kilo-bytes may be stored into the inner memory 11 within 3.13 seconds.

Thus, the present embodiment may shorten the elapsed time for the data and program to be loaded into the inner memory 11 from about 15.3 seconds to about 3.13 seconds. In particular, the present embodiment may omit the communication between the external computer 53 and the assembly unit 51, and the active operation of the CPU 9 in the optical transceiver 1A, which means that the CPU 9 operates as the master device for the external memory 57 and the inner memory 11, which operate as the slave devices, the data and program may be effectively loaded from the external memory 57 to the inner memory 11.

Second Embodiment

An arrangement of an optical transceiver according to the second embodiment will be first described.

Figure 21:
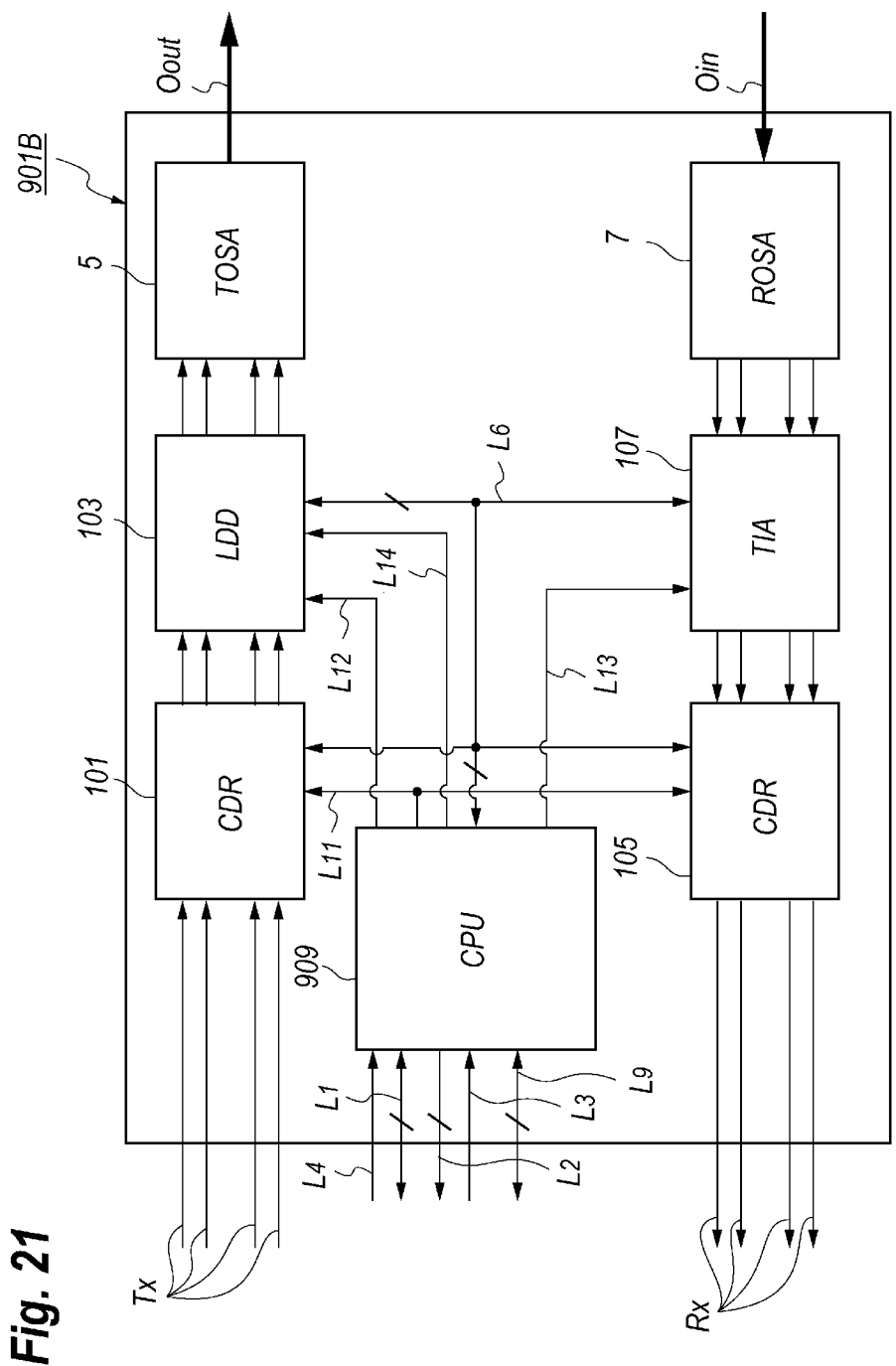
FIG. 21 schematically shows a functional block diagram of another optical transceiver that is also conventionally known.

FIG. 21 shows a functional block diagram of another optical transceiver 901B comparable to the present invention. The optical transceiver 901B, which is implemented within the optical communication system, provides functions of an optical multiplexing, an optical de-multiplexing, an optical to electrical converting, an electrical to optical converting, a signal shaping, and so on. The optical transceiver 901B, which follows the standard of CFP4 MSA (100 Gbit Form-Factor Pluggable 4 Multi-Source Agreement), realizes the optical communication with transmission speed of 100 Gbps. As FIG. 21 illustrates, the optical transceiver 901B includes a CDR 101, the LDD 103, a TOSA 5, a CDR 105, a TIA 107, a ROSA 7, a CPU 909 and so on.

The TOSA 5 implements four (4) laser diodes (LD) that generate optical signals corresponding to four (4) signal lanes, an optical multiplexer that multiplexes the optical signals, and so on. The signal lane corresponds to optical transmission lines each transmitting the optical signals concurrently and independently, and arranged substantially parallel to each other. The TOSA 5, receiving four (4) electrical signals Tx from the outside of the optical transceiver 901B, generates the four optical signals each having wavelengths different from each other and multiplexes these four (4) optical signals into an optical output signal Oout. The ROSA 7 implements four (4) photodiodes (PDs) each receiving optical signals and an optical de-multiplexer. Receiving the optical input signal Oin from the outside of the optical transceiver 901B, the optical de-multiplexer implemented therein de-multiplexes the optical input signal Oin into four (4) optical signals each having wavelengths different from each other. The PDs, receiving the de-multiplexed optical signals, generate four electrical signals Rx and outputs these electrical signals Rx.

The LDD 103 is a circuit unit for driving the four LDs in the TOSA 5 by the input electrical signals Tx. The TIA 107 is another circuit unit for amplifying the electrical signals generated by the PDs in the ROSA 7, which are current signals, and converting those current signals into the output voltage signals Rx. The CDRs, 101 and 105, may reshape waveforms of the electrical input signals Tx and the electrical output signals Rx coming from the TIA 107. The LDD 103 may be integrated within the TOSA 5; that is, the LDD 103 and the TIA 107 may be integrated within a common unit. Also, two CDRs, 101 and 105, may be integrated within a common unit. The optical transceiver 901B may further include circuit units that multiplex and de-multiplex the electrical signals, Tx and Rx, and/or mutually converts the electrical signals, Tx and Rx, by a ratio of n:m, where n and m are integer.

The CPU 909 may be a type of one-chip micro-controller, a field programmable gate array (FPGA), complex programmable logic device (CPLD), or combinations thereof. The CPU 909 may control the optical output signal Oout and the electrical output signals Rx by executing a firmware stored in a built-in memory thereof. The CPU 909 may communicate with a host device through the serial interface $L_1$ type of, for instance, the I2C interface, the management data input/output (MDIO) interface, and so on. The host system may diagnose and control the optical transceiver 901B through this serial interface $L_1$. Also, the CPU 909 provides another communication lines for sending an alarm by the line $L_2$, for receiving suspension of the optical output signal Oout by the line $L_3$, and for resetting the optical transceiver 901B by the line $L_4$. The CPU 909 further provides a clock line and a data line, which is denoted correctively as a serial interface for loading a firmware. While, the CPU 909 provides an internal serial interface $L_6$ type of the I2C interface and so on for the internal communication with the units, 101 to 107, command lines, $L_1$ to $L_{13}$, for resetting those units, 101 to 107, and the other command line $L_{14}$ for suspending the optical output signal Oout, which is denoted as Tx DISABLE.

Figure 22:
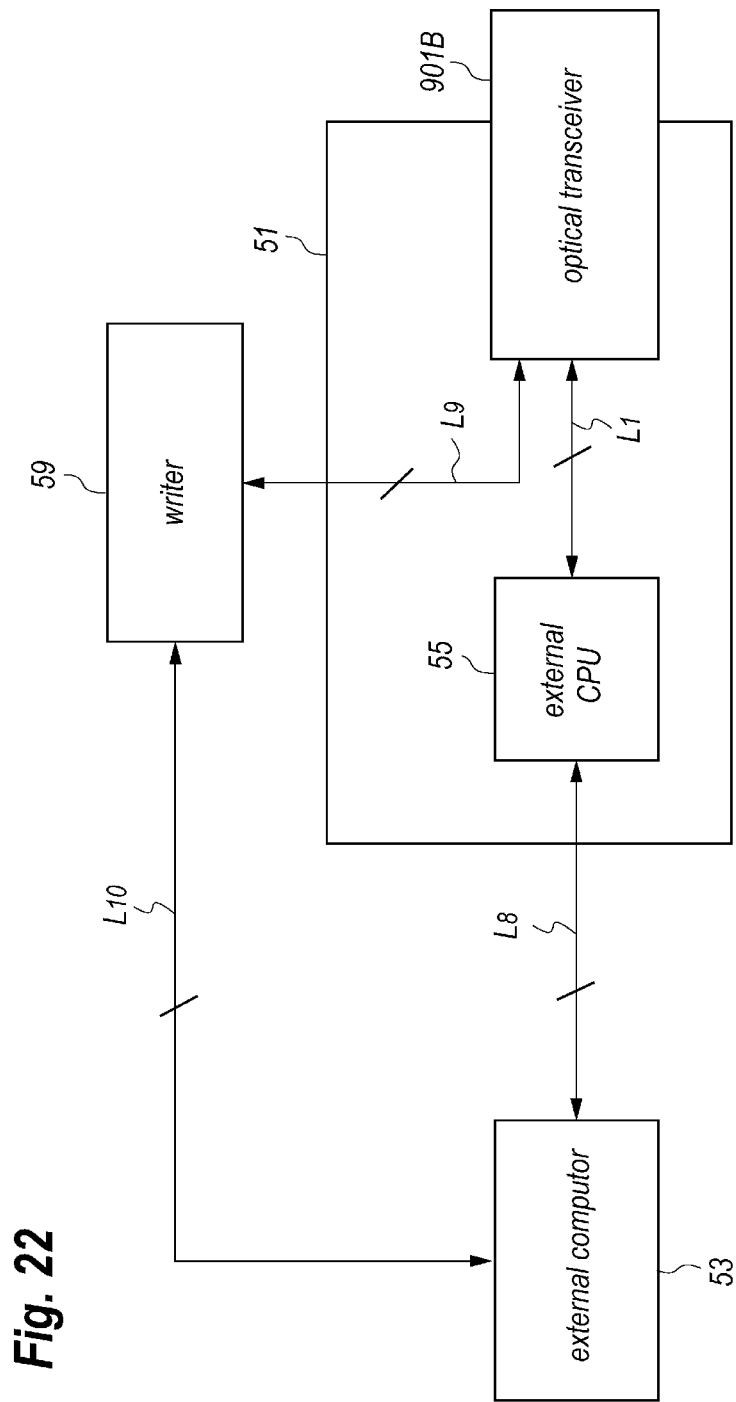
FIG. 22 shows a connection diagram for loading the data and program into the inner memory of the optical transceiver shown in FIG. 17.

Procedures for loading the data into the built-in memory of the CPU 909 will be described. In order to load a firmware into the built-in memory, a most conventional technique has been known where a CPU 909 with the built-in memory storing the firmware is first prepared independent of the optical transceiver 909, and installs such a CPU 909 on the circuit board of the optical transceiver 909. However, another technique is favorable where the firmware is loaded into the built-in memory of the CPU 909 that is already mounted on the circuit board of the optical transceiver 901B. Preparing the assembly unit 51 for loading the data and program shown in FIG. 22, the CPU 55 for converting the format of the transmitted data and the optical transceiver 901B are to be mounted. The serial interface $L_1$ connects the CPU 55 with the optical transceiver 901B on the assembly unit 51 and the external interface $L_8$ type of the universal serial bus (USB) connects the CPU 55 with the external computer 53. The external interface $L_6$ may be another type of the UART. Also, the procedure may further prepare a writer that is connected with the optical transceiver 901B through the serial interface $L_9$, and with the external computer 53 through the communication line $L_{10}$ type of the USB. The firmware may be one of the data and program to be loaded.

The external computer 53 first sends the firmware prepared therein to the writer 59 through the USB line $L_{10}$. The writer 59 transfers thus sent firmware from the external computer 53 to the built-in memory of the CPU 909 in the optical transceiver 901B through the serial interface $L_9$. Thus, the firmware may be loaded in the built-in memory. The CPU 909 does nothing including the control and diagnosis of the optical transceiver 901B or the communication with the outside thereof without the firmware in the built-in memory. Accordingly, the writer 59 is inevitable to first write the firmware within the built-in memory through the serial interface $L_9$ that comprises the clock line and the data line. The CPU 9 inherently provides the function to communicate externally through the clock and data lines even an absence of the firmware. The writer 59 may generate the clock and the data that follow a specific protocol of the serial interface for store the firmware within the built-in memory. Storing the firmware into the built-in memory, the optical transceiver 901B may communicate with the CPU 55 through the serial interface $L_1$.

Figure 23:
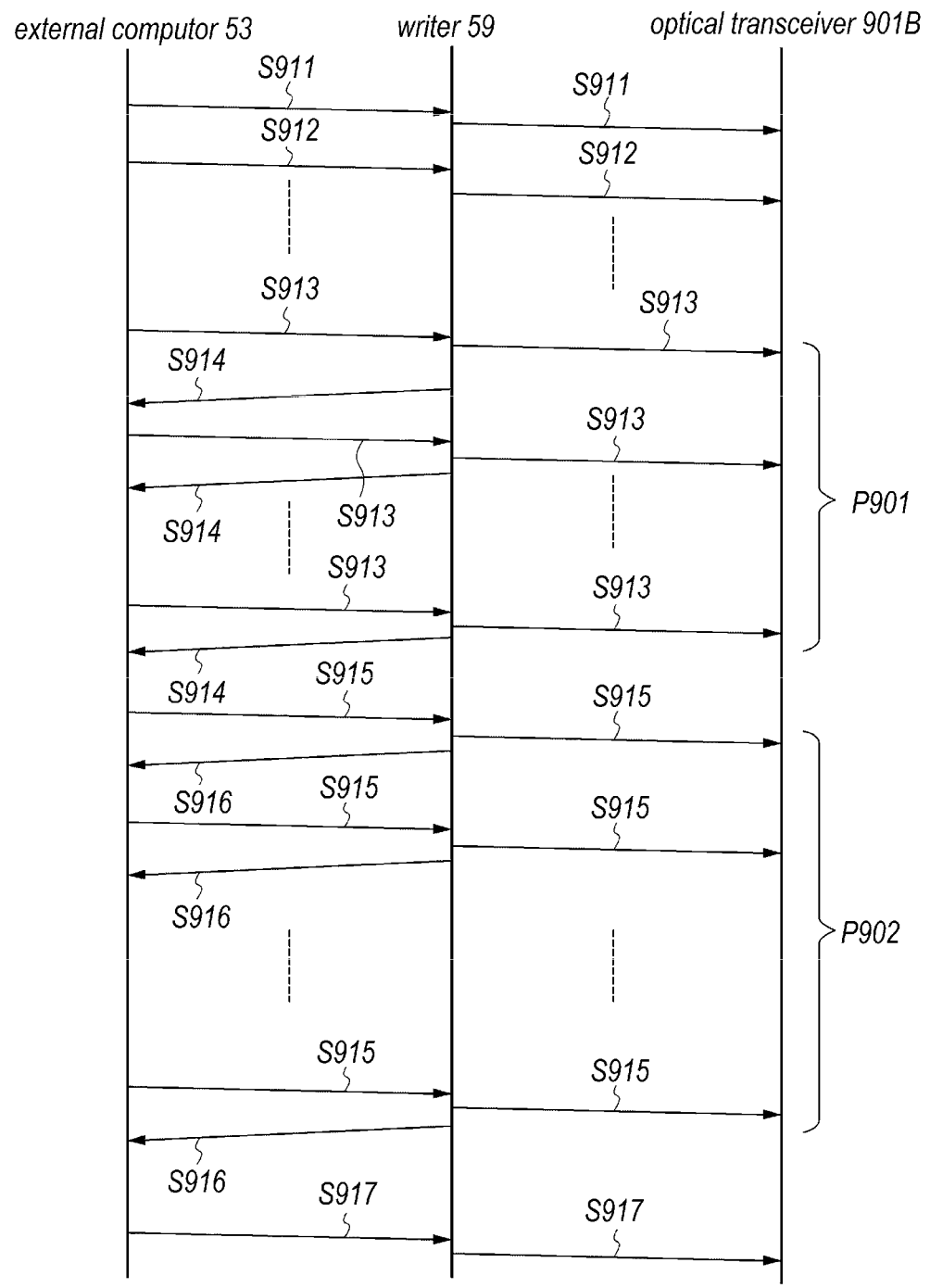
FIG. 23 shows sequence for loading the firmware into the inner memory.

FIG. 23 shows sequence for loading the firmware into built-in memory of the CPU 909. First, the external computer 53 instructs the writer 59 to begin the transfer of the firmware. The writer 59 sends a command to the CPU 909 in the optical transceiver 901B for connecting therewith at step S911. Thereafter, the external computer 53 instructs the writer 59 to erase the data stored in the built-in memory, and the writer 59 transfers the command to the CPU 909. Thus, the whole data in the built-in memory is erased at step S912. Thereafter, the external computer 53 sends a kernel program among the firmware that is to be loaded by dividing the program by the preset size to the writer 59 through the USB interface $L_{10}$, and the writer 59 transfers the kernel program to the built-in memory through the serial interface $L_9$ at step S913. Waiting for about 5 milliseconds, the writer 59 sends the completion of the load to the external computer 53 at step S914. Procedures, S913 and S914, are iterated until the whole kernel program is loaded into the built-in memory, namely, during the period P901. The iteration becomes the quotient of the size of the kernel program divided by the size of the block able to be sent through the serial interface $L_9$ at one cycle, or increment by one depending on a surplus of the division. Furthermore, the external computer 53 sends an application program among the firmware that is to be loaded by dividing the program by the preset size to the writer 59 through the USB interface $L_{10}$, and the writer 59 transfers the application program to the built-in memory through the serial interface $L_9$ at step S915. Waiting for about 5 milliseconds, the writer 59 sends the completion of the load to the external computer 53 at step S916. Procedures, S915 and S916, are iterated until the whole application program is loaded into the built-in memory, namely, during the period P902. The iteration becomes the quotient of the size of the application program divided by the size of the block able to be sent through the serial interface $L_9$ at one cycle, or increment by one depending on a surplus of the division. Thereafter, the external computer 53 sends a command to the writer 59 to complete the load and the writer 59 sends a command to terminate the connection with the CPU 909 at step S917. Thus, the load of the firmware into the built-in memory is completed.

Figure 9:
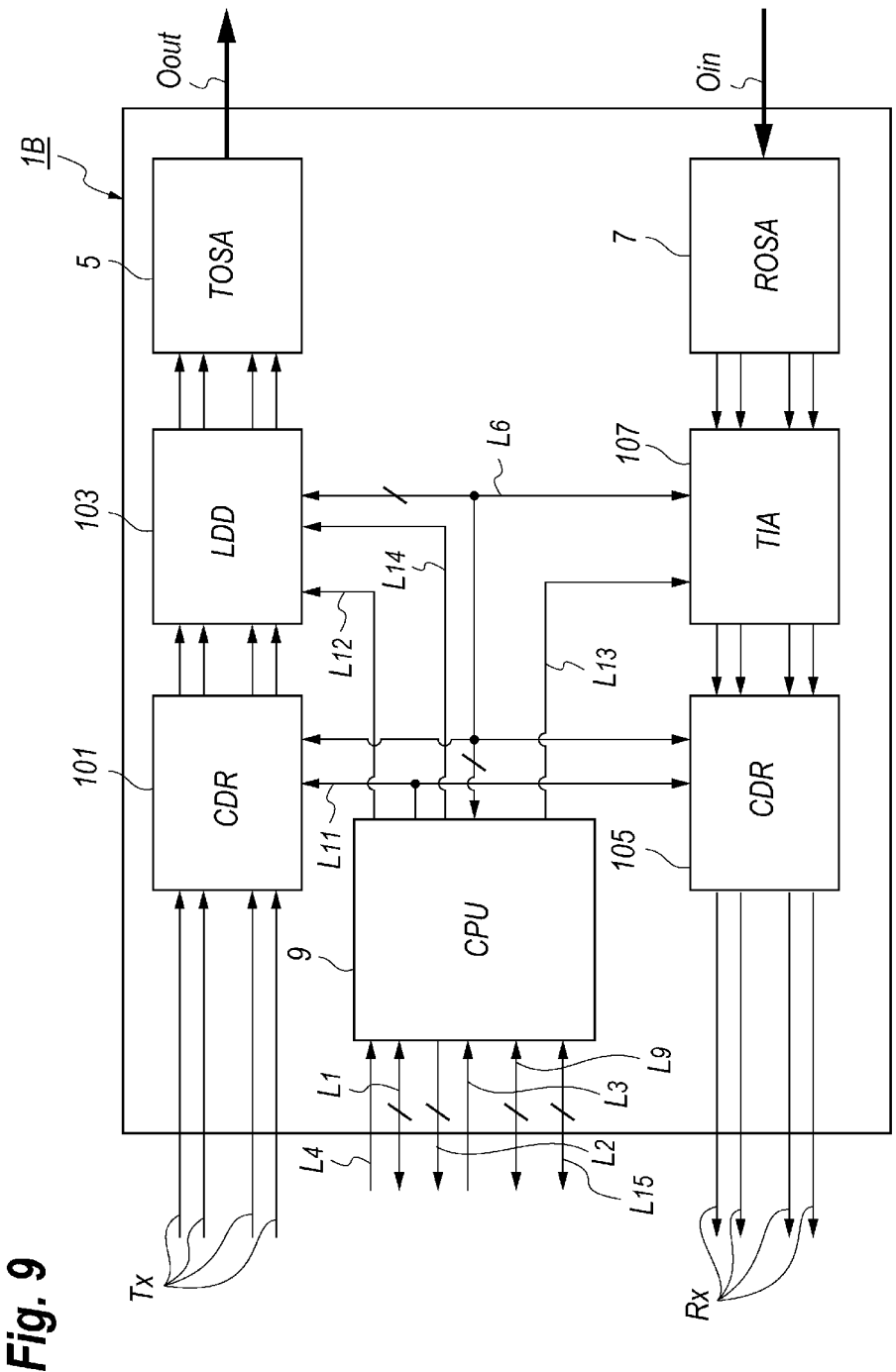
FIG. 9 schematically shows a functional block diagram of an optical transceiver according to the second embodiment of the present invention.

Next, an arrangement of an optical transceiver according to the second embodiment of the present invention will be described as referring to FIG. 9 that shows a functional block diagram of the optical transceiver 1B of the second embodiment. The description below concentrates on arrangements different from those of the conventional one shown in FIG. 21. The CPU 9 of the optical transceiver 1B further provides another serial interface $L_{15}$ type of the I2C interface that includes a data line and a clock line. The CPU 9 may actively read the firmware stored in the external memory 57 through the serial interface $L_{15}$ and stores the firmware into the built-in memory. Other fundamental functions of the CPU 9 are same with those of the CPU 901 in the conventional optical transceiver 901B. Also, the arrangement of the CPU 9 is same with those shown in FIG. 2 including that the built-in memory provides the flash ROM 21 and the RAM 23. The CPU core 19 in the CPU 9 executes the firmware stored in the flash ROM 21 and revises the data stored in the RAM 23.

Procedures for Loading Data and Program

Next, the procedures for loading the data and program into the built-in memory in the optical transceiver 1B of the second embodiment will be described.

Figure 10:
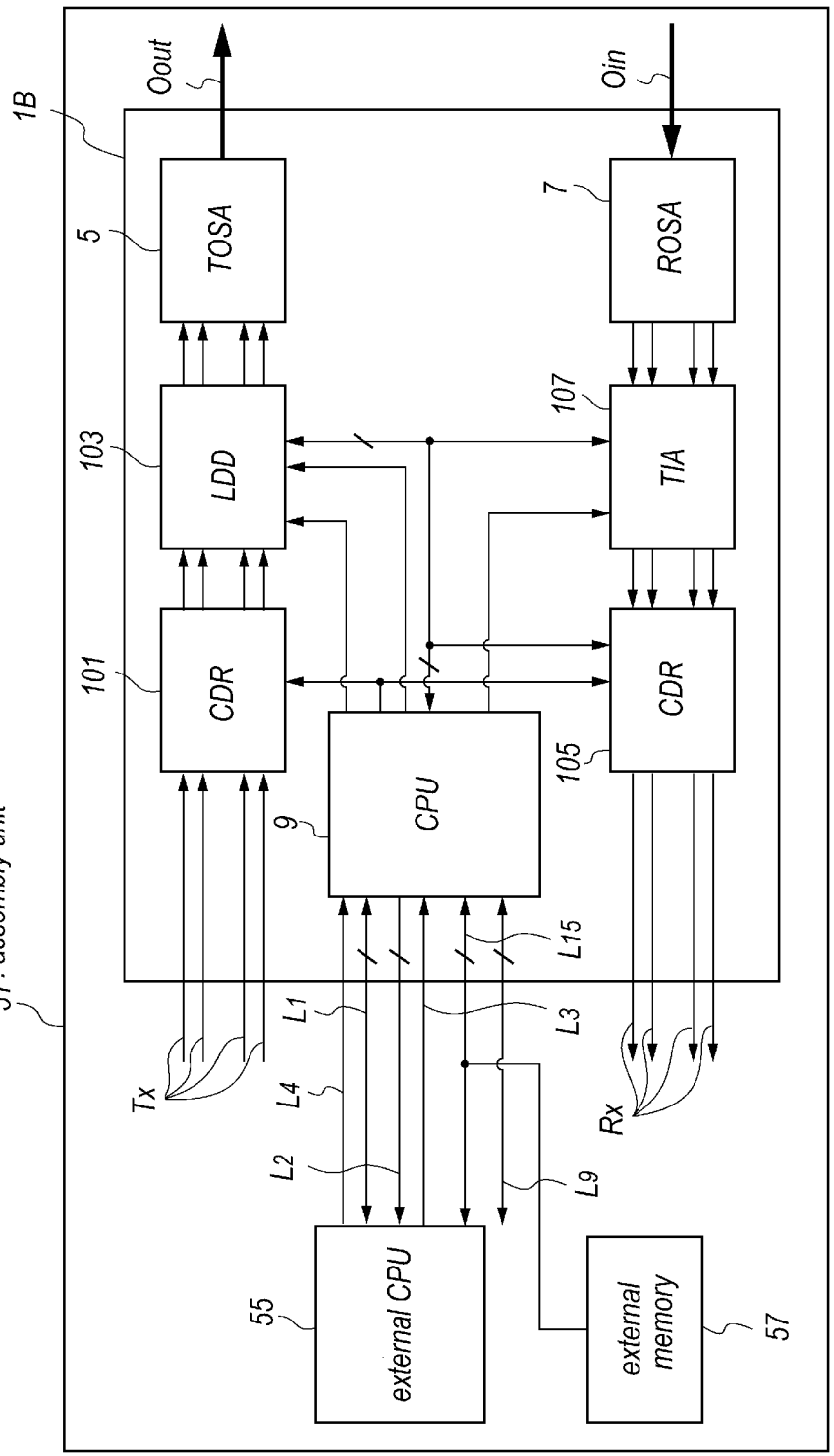
FIG. 10 schematically shows a setup for loading the data and program into the built-in memory according to the second embodiment of the invention.
Figure 11:
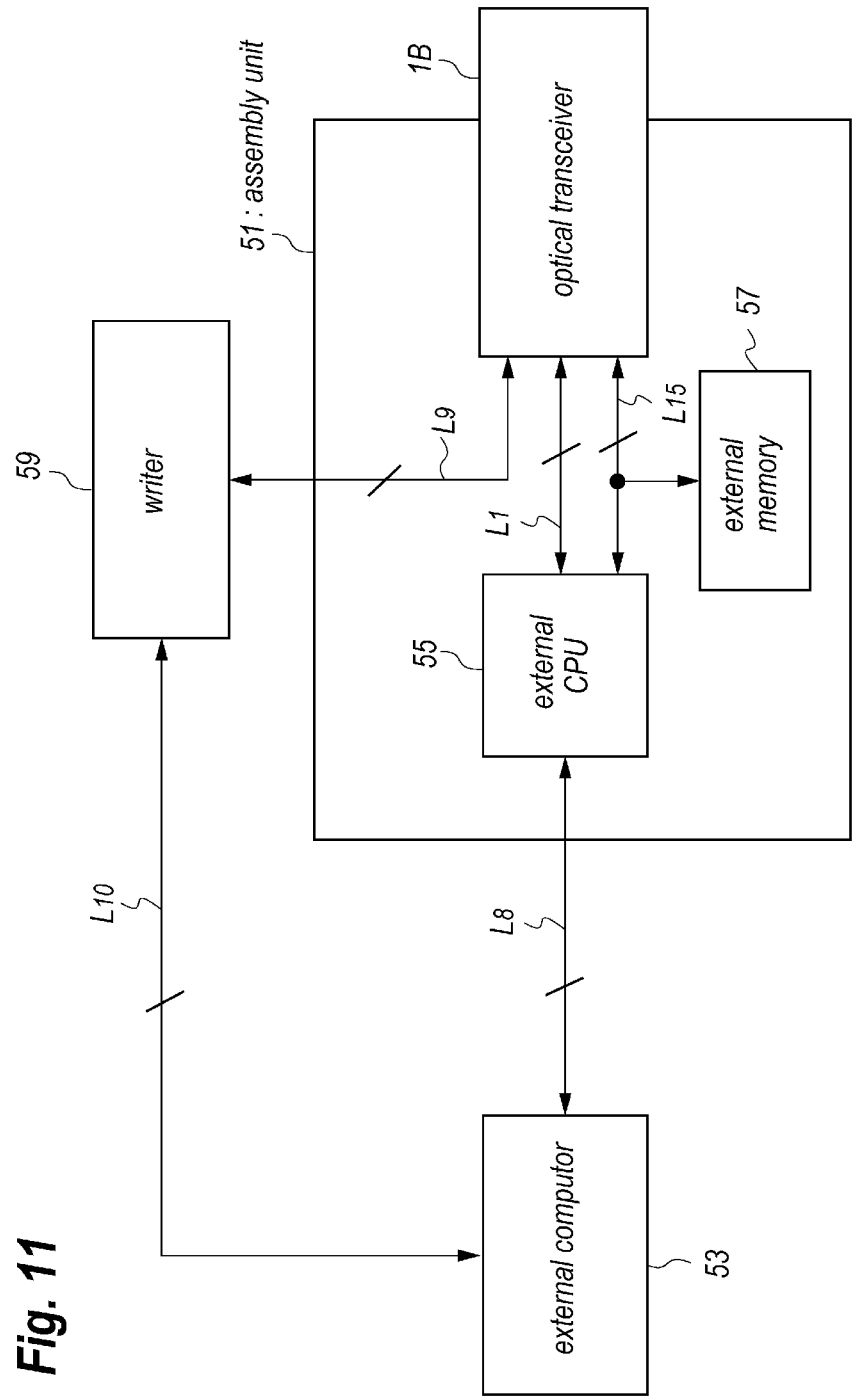
FIG. 11 shows a connection diagram of the setup shown in FIG. 10.

FIG. 10 schematically shows a setup for loading the data and program into the built-in memory, and FIG. 11 shows a connection diagram of the setup shown in FIG. 10. The assembly unit 51 is first prepared, where the assembly unit 51 mounts the external CPU 55, the optical transceiver 1B, the external memory 57, and so on thereon. A serial interface $L_{15}$ connects the external CPU 55, the external memory 57, and the optical transceiver 1B on the assembly unit 51. Also, another serial interface $L_1$ type of the MDIO interface connects the external CPU 55 with the optical transceiver 1B, and the external serial interface $L_8$ type of the USB interface connects the external CPU 55 with the external computer 53.

The external computer 53 first sends the firmware, which is held within the external computer 53 in advance to the practical loading, to the external CPU 55 through the USB interface $L_6$. The CPU 55, responding the transmission of the firmware, converts the format of the firmware from the USB format into the I2C format, and sends thus converted firmware to the external memory 57. The CPU 9 in the optical transceiver 1B actively reads the firmware stored in the external memory 57 and actively loads thus read firmware into the built-in memory. The external memory 57 may store the data and program for controlling the optical transceiver 1B instead of and in addition to the firmware. Also, the CPU 9 may actively read such data and program from the external memory 57 and actively load the data and program into the built-in memory instead of, or in addition to the firmware. In the present invention, a re-load of the firmware, or the data and program, from the external computer 53 to the external memory 57 is unnecessary for respective newly mounted optical transceivers. The firmware, or the data and program, once stored within the external memory 57, may be available for loading the firmware, or the data and program into the built-in memories for optical transceivers sequentially mounted on the assembly unit 51. The external computer 53 and the external serial interface $L_8$ may be extracted from the assembly unit 51 after the first loading of the firmware, or the data and program, into the external memory 57.

Figure 12:
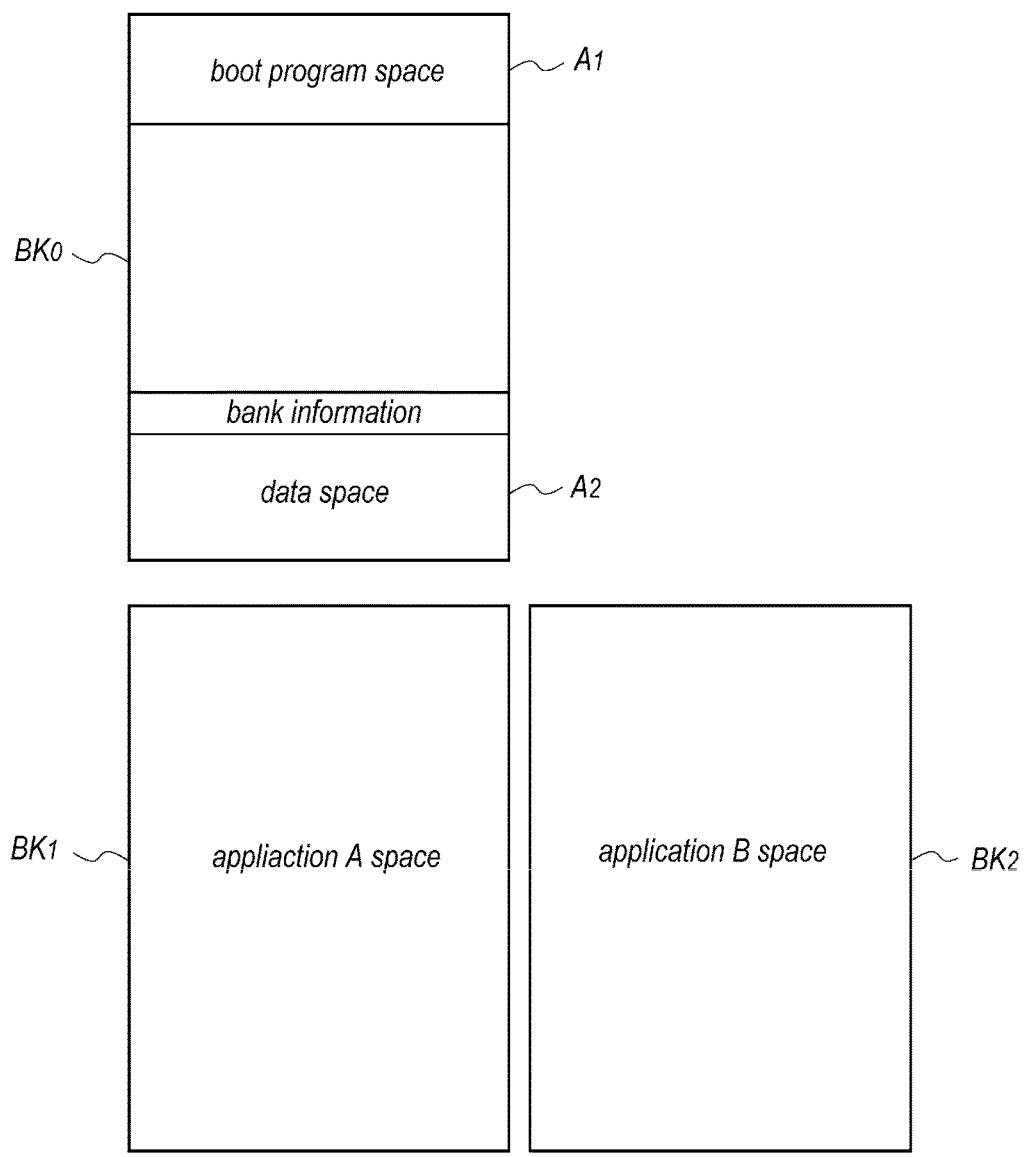
FIG. 12 shows a configuration of the built-in memory that is implemented in the CPU.

FIG. 12 shows a configuration of the firmware stored in the built-in memory. The built-in memory provides three banks, BK0 to BK2, logically and physically divided each other. The built-in memory stores the kernel program, which executes the initializing of the CPU 9 and the fundamental functions such as communications between the built-in units, and application programs that diagnoses and controls the optical transceiver 1B. The bank BK0 provides a space A1 that stores the boot sequence in the kernel program and another space A2 that stores data for executing the kernel program and the back exchange information. The bank BK1 stores the application program A, while, the bank BK2 stores the other application program B. Exchanging the banks by the bank exchange information, the CPU 9 may execute one of the application programs, A and B. In an example, the bank BK2 stores a program for revising the program stored in the bank BK1. The bank BK0 already stores the kernel program for enabling the CPU 9 to actively load the data and program in the banks, BK1 and BK2, by the setup shown in FIG. 11, namely from the external computer 53 through the writer 59 in advance to practically load an application program. That is, the kernel program proves program codes that enable the CPU 9 to actively load the application program into the built-in memory from the external memory 57.

Figure 13:
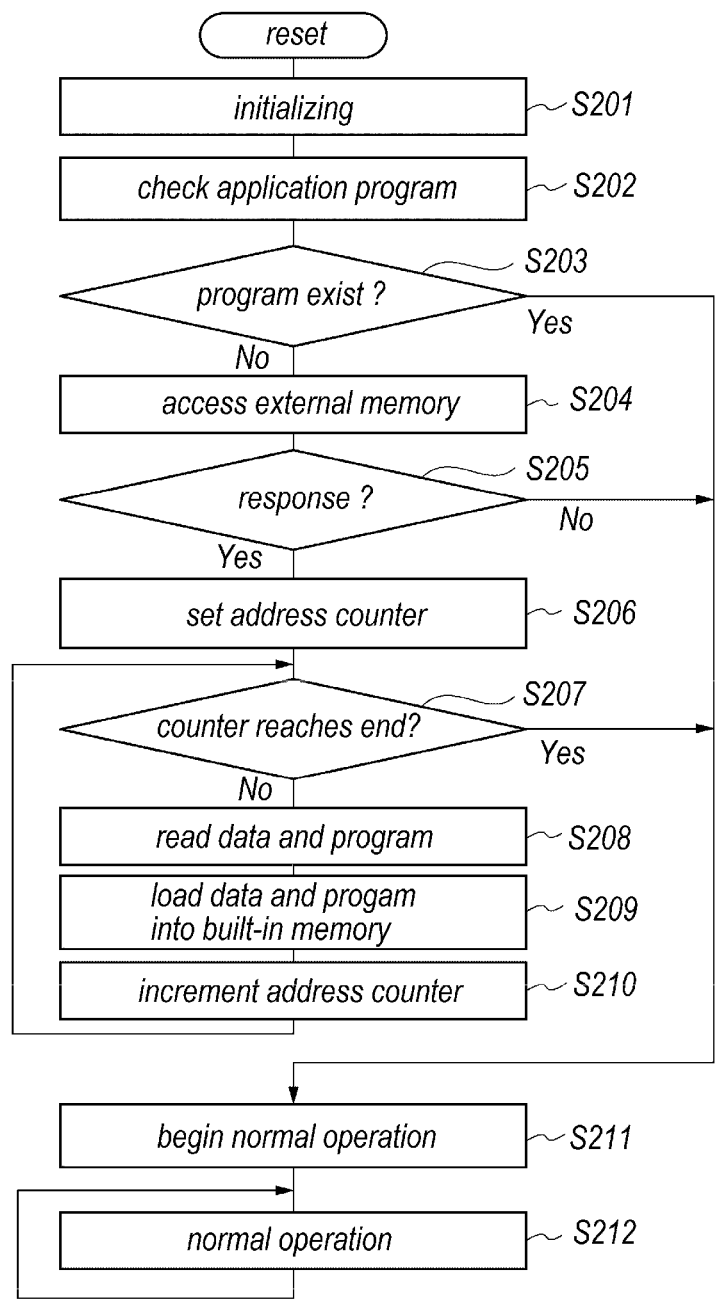
FIG. 13 shows a flow chart for loading the firmware into the built in-memory.

FIG. 13 shows a flow chart for loading the firmware into the built in-memory. After resetting the CPU 9, the CPU 9 first executes the initialization thereof at step S201. During the initialization, the CPU 9 disables the optical output by asserting the command TxDISABLE and resets the units of the CDRs, 101 and 105, the LDD 103, and the TIA 107, that is, those units are set to disable the operations thereof. Then, the CPU 9 checks the banks, BK1 and BK2, in the built-in memory such that the application programs are stored therein or not at step S202. When the application programs are not loaded therein, which corresponds to "No" at step S203, the CPU 9 accesses the external memory 57 at step S204. Detecting the response of the external memory 57; the CPU moves to the write mode. The CPU 9 sets the address counter of the external memory 57, from which the firmware is temporarily stored at step 206, and iterates steps, S208 to S210, until the address counter reaches the end address that corresponds to the size of the firmware. Specifically, the CPU 9 actively reads one block of the application program whose size is typically 256 bytes from the address pointed by the address counter through the serial interface $L_{15}$ at step S208, loads thus read the block of the application program into the built-in memory at step S209, and increases the address counted by the size of the block at step 210.

When the CPU detects that the built-in memory already stores the application program, which corresponds to "Yes" at step S203, when the CPU detects no response from the external memory 57, which corresponds to "No" at step S205, or, when the address counter reaches the size of the application program, which corresponds to "Yes" at step S207; the CPU 9 begins the normal operation at step S212, at which the CPU 9 resets itself, begins the application program, negates the resets for the respective units, 101 to 107, initializes the respective units, 101 to 107, and negates the command TxDISABLE. During the normal operation, the CPU 9 iterates the control and the diagnostic of the optical transceiver 1B.

Figure 14:
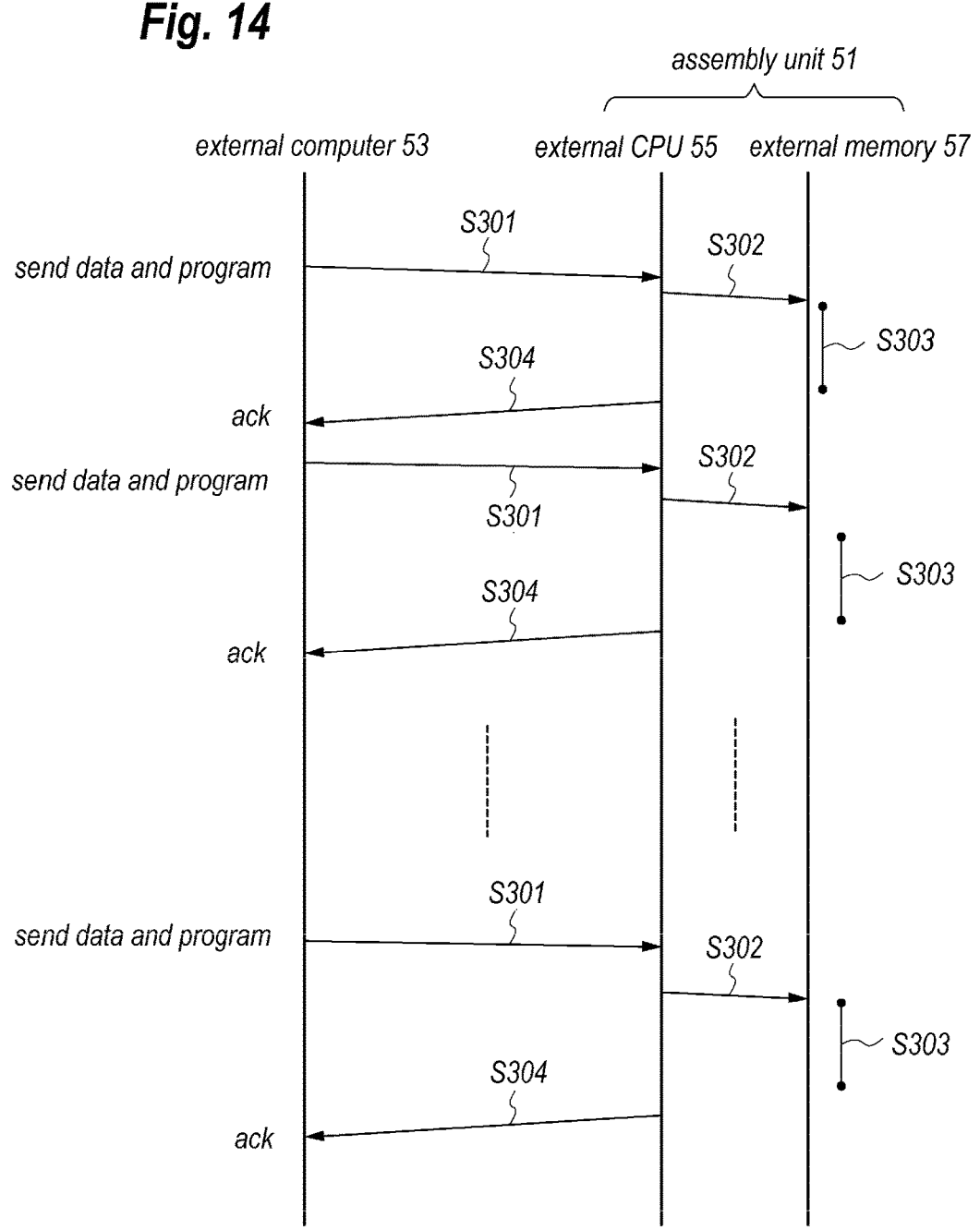
FIG. 14 shows sequence for loading the firmware from the external computer into the external memory before loading into the built-in memory.

FIG. 14 shows sequence for loading the firmware from the external computer into the external memory before loading into the built-in memory. The external computer 53 first sends the firmware, which is divided into the blocks each having the size of 256 bytes, to the external CPU 55 through the external serial interface $L_8$ type of the USB interface at step S301. Then, the external CPU 55 converts the format of the data from the USB interface to the I2C interface and loads the thus converted respective blocks of the firmware into the external memory 57 through the serial interface $L_{15}$ type of the I2C interface at step S302. Waiting a preset period, typically 5 milliseconds, at step S303, the CPU 55 sends ack to the external computer 53 to indicate that the load on one block of the firmware is completed at step S304. Steps, S301 to S304, are iterated until all blocks of the firmware is loaded into the external memory 57. The iteration becomes the quotient of the size of the firmware divided by the size of the one block, or slightly greater for a residue of the division.

Figure 15:
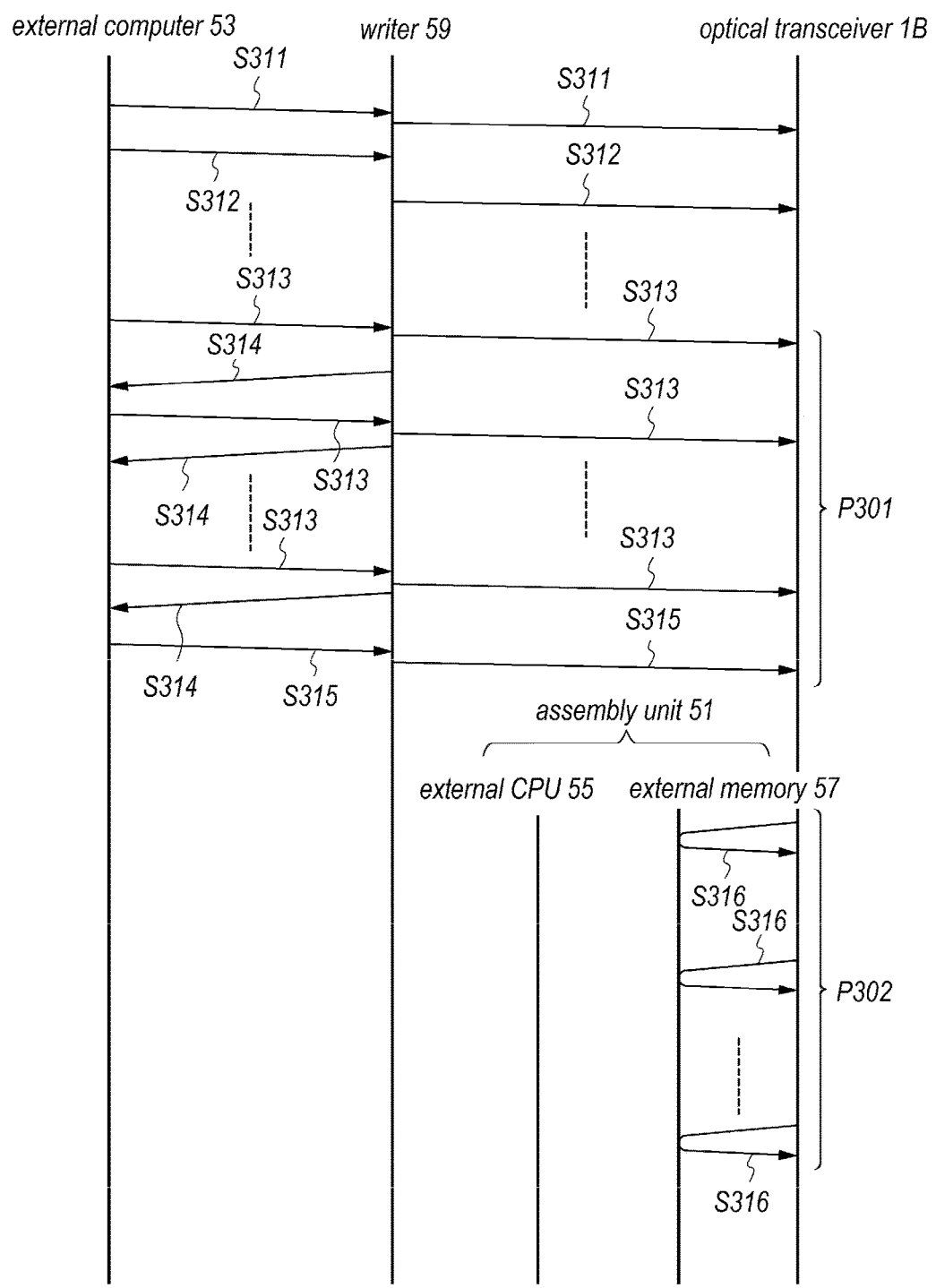
FIG. 15 shows sequence for loading the firmware from the external memory into the built-in memory.

FIG. 15 shows sequence for loading the firmware from the external memory 57 into the built-in memory. First, steps substantially same with step, S911 to S914 and S917 shown in FIG. 23 may load the kernel program into the built-in memory at step P301. Thereafter, the CPU 9 actively reads the blocks of the application program from the external memory 57 and actively load thus read block of the application program into the built-in memory at step S316. The CPU 9 iterates step S316 until the all blocks of the application program are loaded into the built-in memory at step P302. The iteration becomes the quotient of the size of the firmware divided by the size of the one block, or slightly greater for a residue of the division.

Advantages reflecting on the optical transceiver 1B and procedures for loading the firmware will be described.

In the optical transceiver 1B, the CPU 9 actively reads the application program from the external memory 57 when the CPU 9 detects the existence of the external memory 57 through the serial interface $L_{15}$, and actively loads thus read application program into the built-in memory. Thus, only connecting the external memory 57 with the optical transceiver 1B through the serial interface $L_{15}$, the optical transceiver 1B may actively load the application program into the built-in memory. During those operations of loading the application program into the optical transceiver 1B, the communication between the external computer 53 and the writer 59 through the USB interface or the like may be omitted. Thus, the load of the application program may be effectively carried out.

Also, the CPU 9 may begin the load of the application program depending on whether the built-in memory stores the application program or not. Thus, the optical transceiver may be the load of the application program optionally, which may avoid a process for duplicating the load procedure of the application program.

Figure 16:
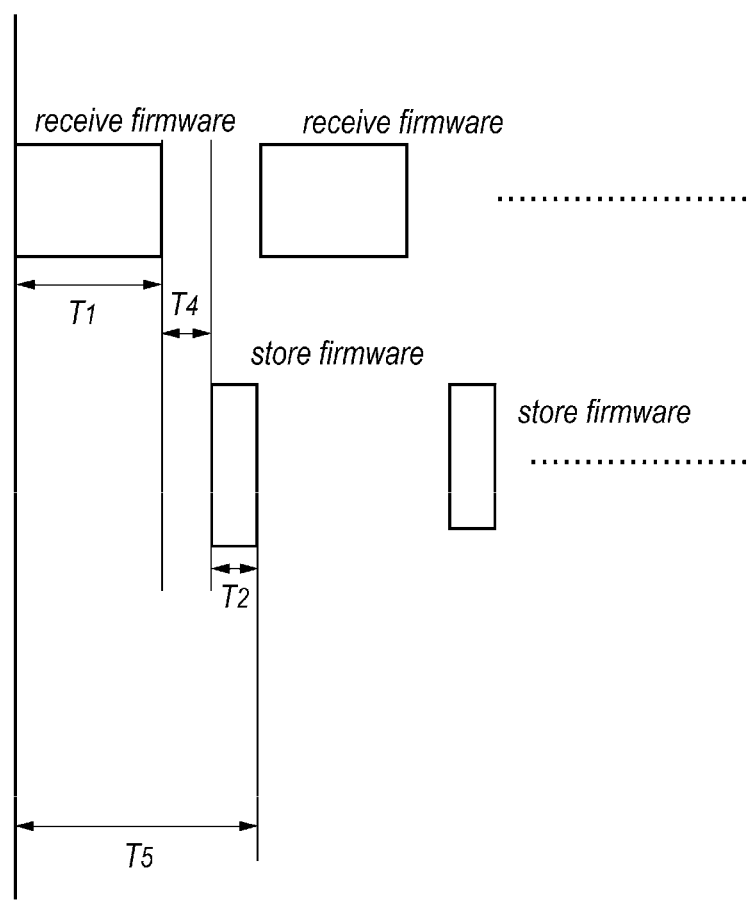
FIG. 16 is a time chart showing respective elapsed time for loading the firmware into the built-in memory of the CPU.

Effectiveness of the load of the firmware according to the present embodiment will be numerically evaluated. FIG. 16 is a time chart showing respective elapsed time for loading the firmware into the built-in memory of the CPU 9. From the time chart, an elapsed time for loading one block of the application program into the built-in memory may be evaluated.

In the procedure of loading the application program, which is comparable to the present embodiment and shown in FIG. 23, the erase of whole data in the built-in memory takes 3 seconds, and the load of the whole firmware, namely, the kernel program and the application program, takes about 10 seconds, accordingly, totally 13 seconds are necessary to the load. Assuming a ratio of the sizes of the kernel program and the application program to 2:8, the load of the kernel program and that of the application program take about 2 seconds and about 8 seconds respectively.

While, as shown in FIG. 16, the present embodiment takes a time T1 for actively reading one block of the application program whose size is 256 bytes through the I2C serial interface with the speed of 400 kbps is estimated to be:

$T_1$=256 bytes×(8 bits+1 bit)/400 kbps=5.76 msec.

Also, a time $T_2$ for the CPU 9 to analyze the read data and load one block of the application program into the built-in memory, assuming the lapsed time to write one byte data to be 85 microseconds, may be estimated to be:

$T2$=256 bytes×85 μsec=21.76 msec.

Further assuming a waiting time $T_4$ from the fetch of the 256 bytes data from the external memory 57 to the load of the 256 bytes data into the built-in memory is 0.5 milliseconds, a total elapsed time $T_5$ for load the 256 bytes data into the built-in memory becomes about 28 milliseconds. Loading the application program in the bank, BK1 or BK2, whose sizes are 32 kbytes, the total elapsed time becomes about 3.6 seconds because the load of the 256 bytes data is necessary to be iterated by 128 times. Moreover, the erase of the whole space of the built-in memory takes 3 seconds and the load of the kernel program takes 2 seconds, accordingly, the total elapsed time to load the kernel program and the application program becomes 8.6 seconds.

Thus, from the evaluation above described, the present embodiment may shorten the elapsed time for loading the data and program into the built-in memory from about 13 seconds to about 8.6 seconds. In particular, the present embodiment may omit the communication between the external computer 53 and the assembly unit 51 during the production of the optical transceiver 1B, the elapsed time for loading the data and program into the inner memory may be effectively shortened.

While particular embodiment of the present invention has been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical transceiver that performs a mutual conversion between an electrical signal and an optical signal, the optical transceiver communicating with an external device, the optical transceiver comprising:
   a first power supply line tar supplying a first power;
   a second power supply line for supplying a second power, the second power supply line being independent of the first power supply line;
   a circuit that receives the second power through the second power supply line and carries out the mutual conversion;
   an inner memory that receives the first power through the first power supply line and stores a first program and a second program;
   a central processing unit (CPU) that receives the first power through the first power supply line and detects the second power;
   a first serial interface through which the CPU communicates with the external device;
   a second serial interface through which the CPU communicates with the inner memory; and
   a communication line through which the CPU and the external device are electrically connected,
   wherein, when the first power becomes higher than a preset level and the second power becomes lower than the preset level, the circuit becomes inoperable, and the CPU begins an operation of loading the second program from the external device through the first serial interface operating as a master device in the first serial interface and stores the second program into the inner memory through the second serial interface and sends a command to the external device through the communication line by executing the first program, the command forbidding an access to the first serial interface by the external device, and
   wherein, when the first power and the second power become higher than the preset level, the circuit becomes operable and the CPU controls, by executing the second program stored in the inner memory, the circuit to carry out the mutual conversion.

2. The optical transceiver of claim 1,
   wherein, in a case when the first power becomes higher than a preset level and the second power becomes lower than the preset level, the CPU begins an operation of further loading data from the external device through the first serial interface; and
   wherein, in a case when the first power and the second power become higher than the preset level, the circuit reads the data stored in the inner memory through the second serial interface.

* * * * *